US012749262B2

(12) United States Patent
Matsunobu et al.

(10) Patent No.: US 12,749,262 B2
(45) Date of Patent: Sep. 29, 2026

(54) THREE-DIMENSIONAL MODEL GENERATION METHOD, THREE-DIMENSIONAL MODEL GENERATION DEVICE, AND NON-TRANSITORY COMPUTER READABLE MEDIUM

(71) Applicant: Panasonic Intellectual Property Management Co., Ltd., Osaka (JP)

(72) Inventors: Toru Matsunobu, Osaka (JP); Satoshi Yoshikawa, Hyogo (JP); Kensho Teranishi, Osaka (JP); Masaki Fukuda, Osaka (JP); Ukyou Katsura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 101 days.

(21) Appl. No.: 18/203,925

(22) Filed: May 31, 2023

(65) Prior Publication Data

US 2023/0394754 A1 Dec. 7, 2023

Related U.S. Application Data

(63) Continuation of application No. PCT/JP2021/041943, filed on Nov. 15, 2021.

(30) Foreign Application Priority Data

Dec. 8, 2020 (JP) ................................ 2020-203334

(51) Int. Cl.
*G06T 17/00* (2006.01)
*G06T 7/13* (2017.01)

(52) U.S. Cl.
CPC ................ *G06T 17/00* (2013.01); *G06T 7/13* (2017.01); *G06T 2207/10012* (2013.01)

(58) Field of Classification Search
CPC ....................... G06T 17/00; G06T 7/13; G06T 2207/10012

(Continued)

(56) References Cited

U.S. PATENT DOCUMENTS 10,430,994 B1 * 10/2019 Baker ....................... G06T 7/55
2001/0005204 A1 * 6/2001 Matsumoto ............. G06T 15/10 345/418

(Continued)

FOREIGN PATENT DOCUMENTS

JP 2011-53809 3/2011
JP 2011-100174 5/2011

(Continued)

OTHER PUBLICATIONS

Extended European Search Report issued Apr. 30, 2024 in corresponding European Patent Application No. 21903121.8.
International Search Report (ISR) issued on Jan. 18, 2022 in International (PCT) Application No. PCT/JP2021/041943.

(Continued)

*Primary Examiner* — Jin Ge
(74) *Attorney, Agent, or Firm* — Wenderoth, Lind & Ponack L.L.P.

(57) ABSTRACT

A three-dimensional model generation method executed by a computer includes: obtaining a first image generated by shooting a subject from a first viewpoint and a second image generated by shooting the subject from a second viewpoint; detecting, in at least the first image, a first line composed of a series of edges and corresponding to a contour of the subject; and generating first three-dimensional points representing the contour, in a three-dimensional space in the computer, based on the first image, the second image, and the first line.

10 Claims, 16 Drawing Sheets

(58) Field of Classification Search
USPC .......................................................... 345/419
See application file for complete search history.

(56) References Cited

U.S. PATENT DOCUMENTS

| | | | | |
|---|---|---|---|---|
| 2011/0052079 | A1 | 3/2011 | Tamura | |
| 2012/0262455 | A1 | 10/2012 | Watanabe et al. | |
| 2012/0327189 | A1 | 12/2012 | Muramatsu et al. | |
| 2016/0098858 | A1 | 4/2016 | Patkar et al. | |
| 2019/0162534 | A1* | 5/2019 | Metzler | H04N 23/62 |
| 2022/0020168 | A1* | 1/2022 | Price | G06F 3/012 |
| 2022/0044441 | A1* | 2/2022 | Kalra | G06V 10/82 |
| 2022/0284672 | A1* | 9/2022 | Teranishi | G06T 7/579 |
| 2024/0135578 | A1* | 4/2024 | Kim | G06T 17/00 |

FOREIGN PATENT DOCUMENTS

| | | |
|---|---|---|
| JP | 2011-191905 | 9/2011 |
| JP | 2013-68417 | 4/2013 |
| JP | 2013-250907 | 12/2013 |
| JP | 2016-14610 | 1/2016 |
| JP | 2017-130146 | 7/2017 |
| JP | 2020-71034 | 5/2020 |

OTHER PUBLICATIONS

Hiroyuki Ukida, “3D Shape Reconstruction of Colored Object Using Image Scanner”, The Papers of Joint Technical Meeting on Information Processing and Information Oriented Industrial System, The Institute of Electrical Engineers of Japan, Sep. 17, 2004, pp. 37-44, with its English translation.

* cited by examiner

THREE-DIMENSIONAL MODEL GENERATION METHOD, THREE-DIMENSIONAL MODEL GENERATION DEVICE, AND NON-TRANSITORY COMPUTER READABLE MEDIUM

CROSS REFERENCE TO RELATED APPLICATIONS

This is a continuation application of PCT International Application No. PCT/JP2021/041943 filed on Nov. 15, 2021, designating the United States of America, which is based on and claims priority of Japanese Patent Application No. 2020-203334 filed on Dec. 8, 2020. The entire disclosures of the above-identified applications, including the specifications, drawings and claims are incorporated herein by reference in their entirety.

FIELD

The present disclosure relates to a three-dimensional model generation method, a three-dimensional model generation device, and a non-transitory computer readable medium.

BACKGROUND

Patent Literature (PTL) 1 discloses a technique of generating a three-dimensional model of a subject, using images obtained by shooting the subject from a plurality of viewpoints.

CITATION LIST

Patent Literature

PTL 1: Japanese Unexamined Patent Application Publication No. 2017-130146

SUMMARY

Solution to Problem

A three-dimensional model generation method according to an aspect of the present disclosure is a three-dimensional model generation method executed by a computer and includes: obtaining a first image generated by shooting a subject from a first viewpoint and a second image generated by shooting the subject from a second viewpoint; detecting, in at least the first image, a first line composed of a series of edges and corresponding to a contour of the subject; and generating first three-dimensional points representing the contour, in a three-dimensional space in the computer, based on the first image, the second image, and the first line.

A three-dimensional model generation device according to an aspect of the present disclosure includes: a computer, wherein the computer: obtains a first image generated by shooting a subject from a first viewpoint and a second image generated by shooting the subject from a second viewpoint; detects, in at least the first image, a first line composed of a series of edges and corresponding to a contour of the subject; and generates first three-dimensional points representing the contour, in a three-dimensional space in the computer, based on the first image, the second image, and the first line.

It should be noted that the present disclosure may be implemented as a program that causes a computer to execute the steps included in the three-dimensional model generation method described above. Furthermore, the present disclosure may be implemented as a non-transitory computer-readable recording medium, such as a CD-ROM, having the above program recorded thereon. Furthermore, the present disclosure may be implemented as information, data, or signal representing the above program. In addition, the program, information, data, and signal may be distributed via a communication network such as the Internet.

Advantageous Effects

A three-dimensional model generation method, and so on according to the present disclosure can improve generation accuracy of three-dimensional models.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Circumstances Leading to the Present Disclosure

Figure 1:
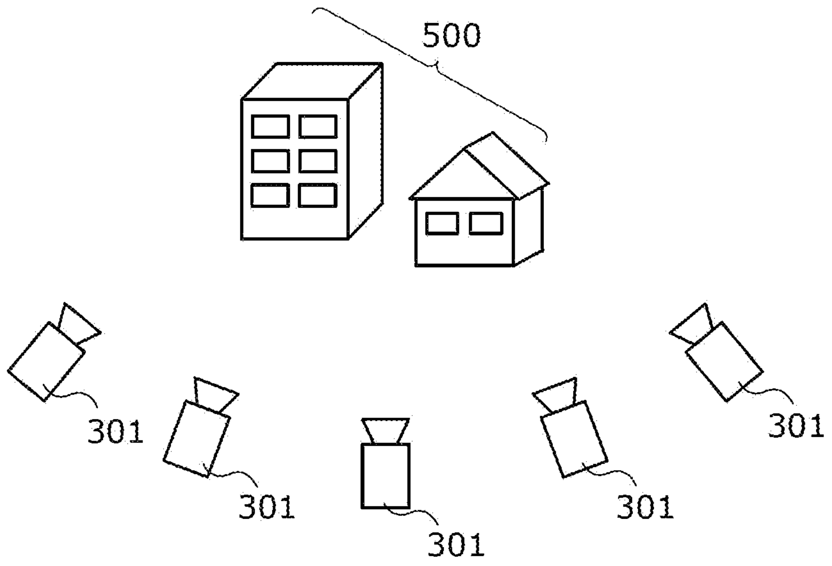
FIG. 1 is a diagram for describing an outline of a three-dimensional model generation method according to Embodiment 1.

In the technique disclosed in PTL 1, a three-dimensional model is generated by searching for a similar point between images. Typically, in the searching of a similar point, when a similar point of a single pixel in a single image is searched for from another image, an epipolar line on the other image is calculated from a geometric constraint of a camera, and searching for a plurality of pixels on the epipolar line is performed. Then, by performing triangulation using pixels matched by searching for the similar point as well as the position and orientation of the camera when the image was shot, the position of a three-dimensional point corresponding to the matched pixels is specified. By performing this for each of the pixels, a three-dimensional model including a plurality of three-dimensional points is generated.

However, according to the prior art described above, since a three-dimensional model is generated using a two-dimensional image, the accuracy of the positions of three-dimensional points included in the three-dimensional model may decrease because of aliasing that occurs in the two-dimensional image. In particular, as the distance of the subject from the camera increases, the size of the space to which one pixel of the two-dimensional image corresponds increases, and therefore, the error of the position of the generated three-dimensional point increases. Therefore, the accuracy of the three-dimensional model generated decreases.

In view of this, the present disclosure provides a three-dimensional model generation method, and so on, that can improve generation accuracy of three-dimensional models.

A three-dimensional model generation method according to an aspect of the present disclosure is a three-dimensional model generation method executed by a computer and includes: obtaining a first image generated by shooting a subject from a first viewpoint and a second image generated by shooting the subject from a second viewpoint; detecting, in at least the first image, a first line composed of a series of edges and corresponding to a contour of the subject; and generating first three-dimensional points representing the contour, in a three-dimensional space in the computer, based on the first image, the second image, and the first line.

Accordingly, a first line corresponding to a contour of a subject is detected in an image, and first three-dimensional points are generated using not only a plurality of images but also the detected first line. Since the first line corresponding to the contour of the subject is detected and the first three-dimensional model is generated by taking the first line into consideration, an error due to aliasing on the images can be reduced. Therefore, the generation accuracy of the first three-dimensional model can be improved.

Furthermore, the first line may be represented in units smaller than pixel units in the first image.

Furthermore, the three-dimensional model generation method may further include: generating second three-dimensional points representing the subject in the three-dimensional space, by performing matching by searching for a similar point between the first image and the second image; and, for the generating of the first three-dimensional points: (i) specifying, based on the first line, third three-dimensional points which correspond to the contour, among the second three-dimensional points; and (ii) correcting positions of the third three-dimensional points.

Accordingly, the third three-dimensional points are specified as a point cloud corresponding to the contour of the subject, and the position of a point cloud is corrected using the point cloud specified. For this reason, the position of a point cloud can be appropriately corrected according to the shape of the contour of the subject.

Furthermore, the three-dimensional model generation method may further include: detecting, in the second image, a second line composed of a series of edges and corresponding to a contour including at least part of the contour to which the first line corresponds; and, for the generating of the first three-dimensional points: (i) specifying, based on the second line, fourth three-dimensional points that correspond to the contour to which the second line corresponds, among the second three-dimensional points, the fourth three-dimensional points including the three-dimensional points that are corrected and a second three-dimensional point that is not corrected; and (ii) correcting a position of at least the second three-dimensional point that is not corrected, among the fourth three-dimensional points.

For this reason, first three-dimensional points corresponding to the continuous contour of the subject can be generated accurately.

Furthermore, the three-dimensional model generation method may further include: for the generating of the first three-dimensional points: specifying a plane by performing principal component analysis on the third three-dimensional points; and correcting the positions of the third three-dimensional points to bring the third three-dimensional points closer to the plane.

Accordingly, the positions of the third three-dimensional points can be accurately corrected according to the shape of the contour.

Furthermore, the three-dimensional model generation method may further include: for the generating of the first three-dimensional points, generating, as the plane, a plane for which a sum of distances from the third three-dimensional points is smaller, between a first plane and a second plane, the first plane passing a center of gravity of the third three-dimensional points and having, as a normal line, a first principal component obtained by way of the principal component analysis, the second plane passing the center of gravity and having, as a normal line, a second principal component obtained by way of the principal component analysis.

For this reason, even when the length of the first line detected is not sufficiently long, the positions of the third three-dimensional points can be accurately corrected according to the first line which is a line segment.

Furthermore, the three-dimensional model generation method may further include: for the generating of the first three-dimensional points: generating an approximate line by performing a least squares method on the third three-dimensional lines; and correcting the positions of the third three-dimensional points to bring the third three-dimensional points closer to the approximate line.

For this reason, the positions of the third three-dimensional points can be accurately corrected according to the approximate line which approximates a point cloud.

Furthermore, the three-dimensional model generation method may further include: for the generating of the first three-dimensional points, removing, from the first three-dimensional points, three-dimensional points located at positions whose distance from the first viewpoint is less than a predetermined distance.

In this manner, since a first three-dimensional model is generated without using a contour in a portion where accuracy tends to be above a certain level, the processing load can be reduced without incurring a deterioration in accuracy.

Furthermore, for the generating of the first three-dimensional points, an edge detected from an image having a predetermined resolution or higher between the first image and the second image, need not be used.

In this manner, since a first three-dimensional model is generated without using a contour in an image where accuracy tends to be above a certain level, the processing load can be reduced without incurring a deterioration in accuracy.

Furthermore, the detecting may include detecting, in the second image, a second line composed of a series of edges and corresponding to the contour of the subject, and the three-dimensional model generation method may further include, for the generating of the first three-dimensional points: (i) correcting the first image and the second image using the first line and the second line, respectively; and (ii) performing matching by searching for a similar point between the first image corrected and the second image corrected.

Accordingly, since a first three-dimensional model is generated using images corrected using a contour, it is possible to generate a first three-dimensional model having reduced error due to aliasing on the images.

A three-dimensional model generation device according to an aspect of the present disclosure includes: a computer, wherein the computer: obtains a first image generated by shooting a subject from a first viewpoint and a second image generated by shooting the subject from a second viewpoint; detects, in at least the first image, a first line composed of a series of edges and corresponding to a contour of the subject; and generates first three-dimensional points representing the contour, in a three-dimensional space in the computer, based on the first image, the second image, and the first line.

According to this, a contour of a subject is detected in an image, and a first three-dimensional model is generated using not only a plurality of images but also the contour. Since the contour of the subject is detected and the first three-dimensional model is generated by taking the contour into consideration, an error due to aliasing on the images can be reduced. Therefore, the generation accuracy of the first three-dimensional model can be improved.

Hereinafter, respective embodiments of a three-dimensional model generation method, etc., according to the present disclosure will be described in detail with reference to the drawings. It should be noted that each of the subsequently described embodiments shows a specific example of the present disclosure. Accordingly, numerical values, shapes, structural components, the arrangement and connection of the structural components, steps, and the processing order of the steps, etc., shown in each of the following embodiments are merely examples, and are therefore not intended to limit the scope of the present disclosure.

Furthermore, the respective figures are not necessarily precise illustrations. In the figures, structural components that are substantially the same are assigned the same reference signs, and overlapping description thereof may be omitted or simplified.

Embodiment 1

Outline

First, referring to FIG. 1, the outline of a three-dimensional model generation method according to Embodiment 1 will be described.

Figure 2:
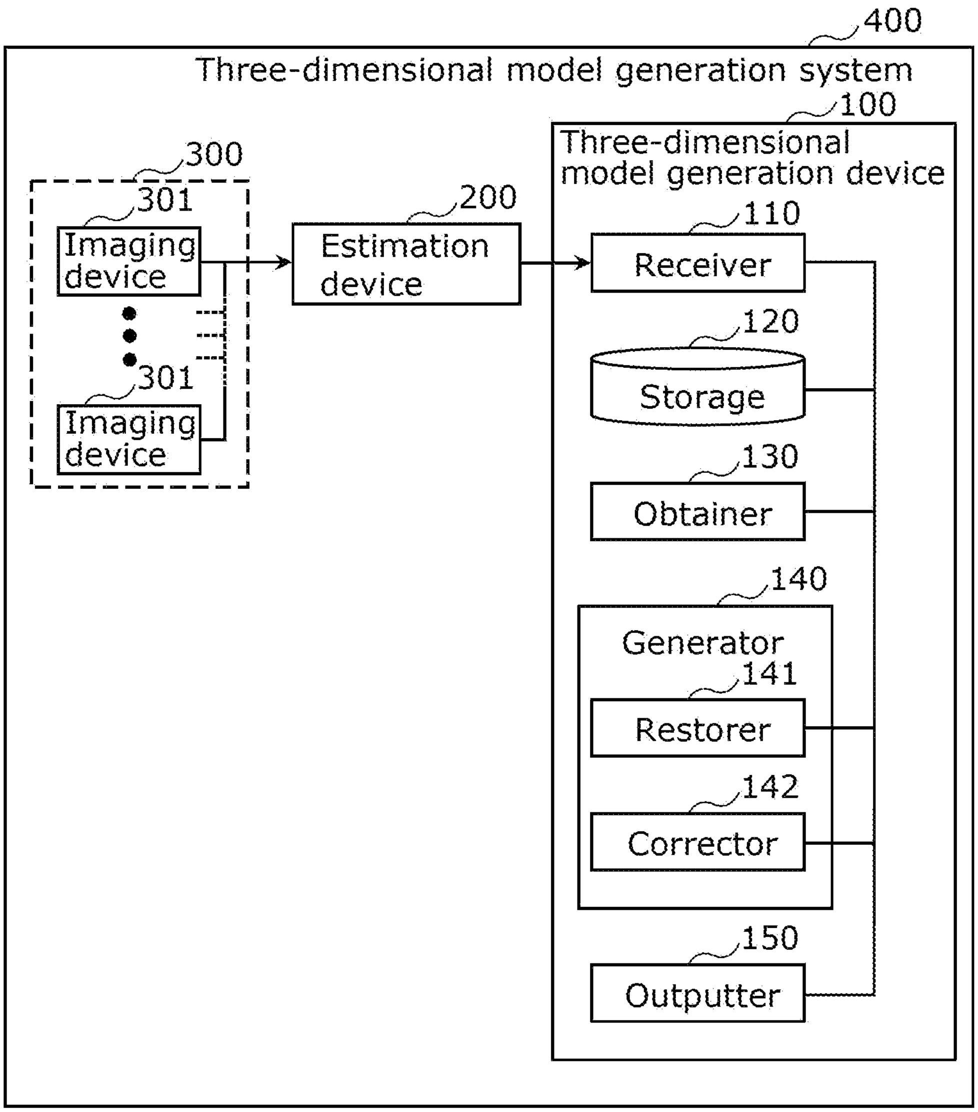
FIG. 2 is a block diagram illustrating the characteristic configuration of a three-dimensional model generation device according to Embodiment 1.

FIG. 1 is a diagram for describing the outline of the three-dimensional model generation method according to Embodiment 1. FIG. 2 is a block diagram illustrating the characteristic configuration of three-dimensional model generation device 100 according to Embodiment 1.

In the three-dimensional model generation method, as illustrated in FIG. 1, the three-dimensional model of a predetermined region is generated from a plurality of images shot from a plurality of different viewpoints using a plurality of imaging devices 301. Here, the predetermined region is a region including a stationary static object or a moving object such as a person, or the both. In other words, the predetermined region is a region including, for example, at least one of a stationary static object or a moving object as a subject.

As an example of the predetermined region including a static object and an animal body, there is a venue where a sport game such as a basketball game is being held, a space on a road where a person or a vehicle exists, or the like. Note that the predetermined region may include not only a specific object to be used as a subject, but also scenery, etc. FIG. 1 illustrates a case where subject 500 is a building. Additionally, hereinafter, the predetermined region including not only a specific object to be used as a subject, but also scenery, etc. is also simply called the subject.

As illustrated in FIG. 2, three-dimensional model generation system 400 includes imaging device group 300 including a plurality of imaging devices 301, estimation device 200, and three-dimensional model generation device 100.

Imaging Devices

Imaging devices 301 are imaging devices that shoot a predetermined area. Each of imaging devices 301 shoots a subject, and outputs each of a plurality of shot frames to estimation device 200. In Embodiment 1, two or more imaging devices 301 are included in imaging device group 300. Additionally, imaging devices 301 shoot the same subject from a plurality of mutually different viewpoints. A frame is, in other words, an image.

Note that, although it has been assumed that three-dimensional model generation system 400 includes imaging device group 300, three-dimensional model generation system 400 is not limited to this, and may include one imaging device 301. For example, in three-dimensional model generation system 400, while moving one imaging device 301, the one imaging device 301 may be caused to generate, for a subject that exists in a real space, a multi-viewpoint image formed from a plurality of frames having mutually different viewpoints. The plurality of frames are frames shot (generated) with imaging devices 301 that differ from each other in at least one of the position or orientation, respectively. In other words, the plurality of frames are frames shot from mutually different viewpoints.

Additionally, each imaging device 301 may be an imaging device that generates a two-dimensional image, or an imaging device with a three-dimensional measuring sensor that generates a three-dimensional model. In the present embodiment, each of imaging devices 301 is an imaging device that generates a two-dimensional image by shooting a subject.

Each of imaging devices 301 may be directly connected to estimation device 200 by wired communication or wireless communication, so as to be able to output the shot frames to estimation device 200, or may be indirectly connected to estimation device 200 via a hub, such as a communication equipment or a server, which is not illustrated.

Note that the frames shot with imaging devices 301, respectively, may be output to estimation device 200 in real time. Additionally, after the frames are once recorded in external storage devices, such as a memory or a cloud server, the frames may be output from these external storage devices to estimation device 200.

Additionally, imaging devices 301 may be fixed cameras such as surveillance cameras, respectively, may be mobile cameras such as video cameras, smart phones, or wearable cameras, or may be moving cameras such as drones with a shooting function.

Estimation Device

Estimation device 200 performs camera calibration by causing one or more imaging devices 301 to shoot a subject from a plurality of viewpoints. Estimation device 200 performs the camera calibration that estimates the positions and orientations of imaging devices 301 based on, for example, a plurality of frames shot with imaging devices 301. Here, the orientation of imaging device 301 indicates at least one of the shooting direction of imaging device 301, or the inclination of imaging device 301. The shooting direction of imaging device 301 is the direction of the optical axis of imaging device 301. The inclination of imaging device 301 is the rotation angle around the optical axis of imaging device 301 from a reference orientation.

Specifically, estimation device 200 estimates camera parameters of imaging devices 301, based on a plurality of frames obtained from imaging devices 301. Here, the camera parameters are parameters that indicate the characteristics of imaging devices 301, and include internal parameters including a focal point distance, an image center, etc. of imaging device 301, and external parameters indicating the position (more specifically, three-dimensional position) and orientation of imaging device 301. That is, the position and orientation of each of imaging devices 301 are obtained by estimating respective camera parameters.

Note that the estimation method of estimating, by estimation device 200, the positions and orientations of imaging devices 301 is not particularly limited. Estimation device 200 may estimate the positions and orientations of imaging devices 301 by using, for example, the Visual-SLAM (Simultaneous Localization and Mapping) technology. Alternatively, estimation device 200 may estimate the positions and orientations of imaging devices 301 by using, for example, the Structure-From-Motion technology.

Figure 3:
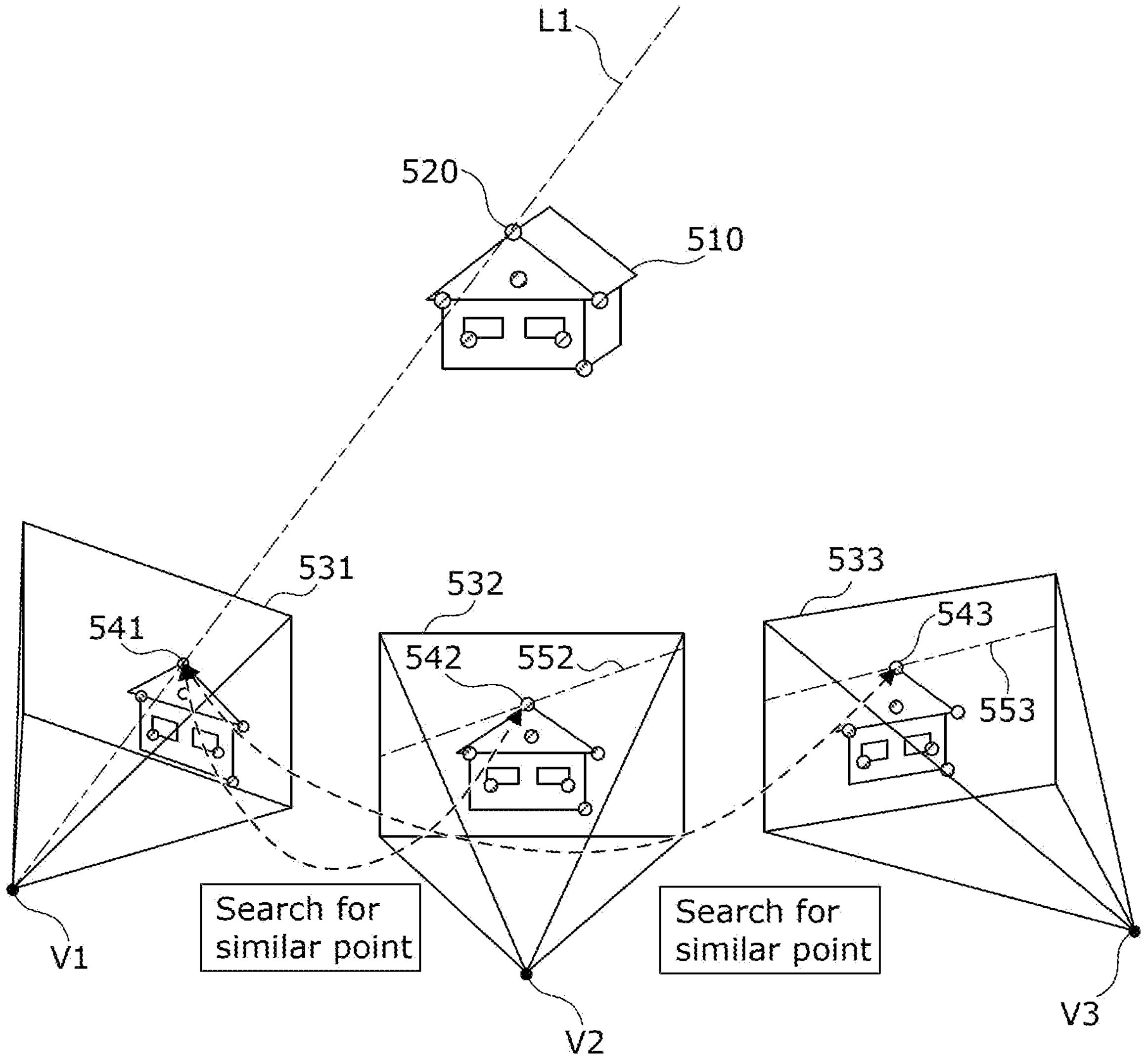
FIG. 3 is a diagram for describing search processing according to Embodiment 1.

Here, an method of estimating positions and orientations of imaging devices 301 by estimation device 200 will be described using FIG. 3. Although FIG. 3 is a diagram for describing search processing by a restorer described later, since part of the process performed in the estimation method is the same, description will be carried out using FIG. 3.

Estimation device 200 performs searching for feature points by extracting characteristic points from frames 531 to 533 shot with imaging devices 301 as feature points, respectively, by using the Visual-SLAM technology or the Structure-From-Motion technology, and extracts a set of similar points that are similar between a plurality of frames among the extracted feature points. Since estimation device 200 can identify a point on subject 510 reflected in common in frames 531 to 533 by performing the searching for feature points, the three-dimensional coordinates (i.e., the three-dimensional position) of the point on subject 510 can be obtained with the principle of triangulation by using the set of the extracted similar points.

In this manner, estimation device 200 can estimate the position and orientation of each imaging device 301 by extracting a plurality of sets of similar points, and using the sets of similar points. In the process of estimating the position and orientation of each imaging device 301, estimation device 200 calculates three-dimensional coordinates for each set of similar points, and generates three-dimensional model 520 including a plurality of three-dimensional points indicated by the plurality of calculated three-dimensional coordinates. Each of the plurality of three-dimensional points indicates the position on the subject in the three-dimensional space. Estimation device 200 obtains, as estimation results, the position and orientation of each imaging device 301, and the map information. Since the obtained three-dimensional model 520 is processed for optimization with the camera parameters, the obtained three-dimensional model 520 is information with higher accuracy than predetermined accuracy. Additionally, three-dimensional model 520 includes the three-dimensional position of each of the plurality of three-dimensional points. Note that three-dimensional model 520 may include not only the plurality of three-dimensional positions, but also the color of each three-dimensional point, the surface shape around each three-dimensional point, information indicating the frame from which each three-dimensional point is generated, etc.

Additionally, in order to increase the speed of the estimation processing, estimation device 200 may generate three-dimensional model 520 including a sparse three-dimensional point cloud by limiting the number of sets of similar points to a predetermined number. This is because estimation device 200 can estimate the position and orientation of each imaging device 301 with sufficient accuracy, even with the sets of similar points that are limited to a predetermined number. Note that the predetermined number may be determined to be a number with which the position and orientation of each imaging device 301 can be estimated with sufficient accuracy. Additionally, estimation device 200 may estimate the position and orientation of each imaging device 301 by using sets that are similar at or above a predetermined degree of similarity among the sets of similar points. As a result, estimation device 200 can limit the number of sets of similar points used for the estimation processing to the number of sets that are similar at or above the predetermined similarity.

Additionally, based on, for example, the position and orientation of imaging device 301 estimated by using the above-described technology, estimation device 200 may calculate the distance between imaging device 301 and subject 510 as a camera parameter. Note that three-dimensional model generation system 400 may include a distance measurement sensor, and the distance between imaging device 301 and subject 510 may be measured by using the distance measurement sensor.

Estimation device 200 may be directly connected to three-dimensional model generation device 100 by wired communication or wireless communication, or may be indirectly connected to estimation device 200 via a hub, such as a communication equipment or a server, which is not illustrated. Accordingly, estimation device 200 outputs a plurality of frames received from imaging devices 301, and a plurality of estimated camera parameters of imaging devices 301 to three-dimensional model generation device 100.

Note that the camera parameters estimated by estimation device 200 may be output to three-dimensional model generation device 100 in real time. Additionally, after the camera parameters are once recorded in external storage devices, such as a memory or a cloud server, the camera parameters may be output from these external storage devices to three-dimensional model generation device 100.

Estimation device 200 includes at least a computer system that includes, for example, a control program, a processing circuit such as a processor or a logical circuit that executes the control program, and a recording device such as an internal memory or an accessible external memory storing the control program.

Three-Dimensional Model Generation Device

Three-dimensional model generation device 100 generates the three-dimensional model of a predetermined area, based on a plurality of frames shot with imaging devices 301, and camera parameters estimated by estimation device 200. Specifically, three-dimensional model generation device 100 is a device that performs three-dimensional model generation processing that generates the three-dimensional model of a subject in a virtual three-dimensional space, based on the camera parameters corresponding to respective imaging devices 301, and the plurality of frames.

Note that the three-dimensional model of the subject is data including the three-dimensional shape of the subject and the color of the subject that are restored in the virtual three-dimensional space from the frames obtained by shooting the actual subject. The three-dimensional model of the subject is a set of points indicating the respective three-dimensional positions of a plurality of points on the subject reflected to each of a plurality of two-dimensional images shot with a plurality of imaging devices 301 from multiple viewpoints, that is, a plurality of different viewpoints.

A three-dimensional position is represented by, for example, three-value information formed from a X component, a Y component, and a Z component that indicate the positions on an X-axis, a Y-axis, and a Z-axis that are orthogonal to each other, respectively. Specifically, the three-dimensional position is represented by three-dimensional coordinates in a three-dimensional rectangular coordinate system. Note that the three-dimensional point is not limited to being represented by three-dimensional coordinates in a three-dimensional rectangular coordinate system, and may be represented by three-dimensional coordinates in a three-dimensional polar coordinate system. Furthermore, aside from position information indicating a three-dimensional position, the information included in a plurality of points indicating three-dimensional positions may include, not only the three-dimensional positions (that is, information indicating coordinates), but also attribute information indicating the color of each point, information representing the surface shapes of each point and its surrounding, etc.

Three-dimensional model generation device 100 includes at least a computer system that includes, for example, a control program, a processing circuit such as a processor or a logical circuit that executes the control program, and a recording device such as an internal memory or an accessible external memory storing the control program. Three-dimensional model generation device 100 is an information processing device. The function of each processing unit of three-dimensional model generation device 100 may be realized by software, or may be realized by hardware.

Additionally, three-dimensional model generation device 100 may store the camera parameters of imaging devices 301 in advance. In this case, three-dimensional model generation system 400 need not include estimation device 200. Additionally, imaging devices 301 may be communicatively connected to three-dimensional model generation device 100 wirelessly or with wires.

Additionally, frames shot with imaging devices 301 may be directly output to three-dimensional model generation device 100. In this case, imaging devices 301 may be directly connected to three-dimensional model generation device 100 by wired communication or wireless communication, or may be indirectly connected to three-dimensional model generation device 100 via a hub, such as a communication equipment or a server, which is not illustrated.

Subsequently, the details of the configuration of three-dimensional model generation device 100 will be described with reference to FIG. 2.

Three-dimensional model generation device 100 is a device that generates a three-dimensional model from a plurality of frames. Three-dimensional model generation device 100 includes receiver 110, storage 120, obtainer 130, generator 140, and outputter 150.

Receiver 110 receives, from estimation device 200, frames shot with imaging devices 301, and the camera parameters estimated by estimation device 200. Accordingly, receiver 110 obtains a first frame (first image) obtained by shooting a subject from a first viewpoint, and a second frame (second image) obtained by shooting the subject from a second viewpoint. In other words, the plurality of frames received by receiver 110 include the first frame and the second frame. For example, when the subject is a static object, the plurality of frames are frames obtained by shooting the subject from different viewpoints. For example, when the subject is a moving object, the plurality of frames are frames obtained by shooting the subject from a plurality of viewpoints at a particular timing (that is, simultaneously). Three-dimensional model generation device 100 performs processing for generating a first three-dimensional model, which has, as processing units, a frame set having a plurality of frames as 1 set. The frame set may be referred to as multi-view images. Receiver 110 may obtain three-dimensional model 520 from estimation device 200. Receiver 110 outputs the received frames and camera parameters to storage 120.

Receiver 110 is, for example, a communication interface for communicating with estimation device 200. When three-dimensional model generation device 100 and estimation device 200 perform wireless communication, receiver 110 includes, for example, an antenna and a wireless communication circuit. Alternatively, when three-dimensional model generation device 100 and estimation device 200 perform wired communication, receiver 110 includes, for example, a connector connected to a communication line, and a wired communication circuit. Note that receiver 110 may receive frames from imaging devices 301 without going through estimation device 200.

Storage 120 stores the plurality of frames and the plurality of camera parameters that are received by receiver 110. Storage 120 may store three-dimensional model 520 received by receiver 110. Note that storage 120 may store processing results of respective processing units included in three-dimensional model generation device 100. Storage 120 stores, for example, a control program executed by each processing unit included in three-dimensional model generation device 100. Storage 120 is realized by, for example, an HDD (Hard Disk Drive), flash memory, etc.

Obtainer 130 obtains, from storage 120, a plurality of frames, and the camera parameters of each imaging device 301, which are stored in storage 120, and outputs them to generator 140.

Note that three-dimensional model generation device 100 need not include storage 120 and obtainer 130. In this case, receiver 110 may output, to generator 140, the frames received from imaging devices 301, and the camera parameters of each imaging device 301 received from estimation device 200.

Generator 140 generates a first three-dimensional model using a plurality of frames and a plurality of camera parameters. The first three-dimensional model includes a plurality of first three-dimensional points. Generator 140 has restorer 141 and corrector 142. Restorer 141 generates a plurality of second three-dimensional points that represent a subject in a three-dimensional space by performing matching by searching for a similar point between a plurality of frames, such as a first frame and a second frame. Corrector 142 corrects the positions of the plurality of second three-dimensional points. In this way, the first three-dimensional model is generated. The plurality of first three-dimensional points included in the first three-dimensional model are generated by corrector 142 correcting at least some of the plurality of second three-dimensional points. In the following, restorer 141 and corrector 142 will be specifically described.

Restorer 141 searches for a similar point that is similar to a first point in a first frame among the frames from a plurality of second points in a search area, which is based on the first point, in a second frame. The first frame is a frame (image) of a plurality of frames that is searched for a first point. The second frame is a frame (image) among the remaining frames, which are the plurality of frames excluding the first frame, that is searched for a similar point that is similar to the first point. Specifically, the first point is a first pixel among a plurality of first pixels. The plurality of first pixels are pixels included in the first frame, such as all the pixels included in the first frame. The search area is an area in second frames that is defined by an epipolar line corresponding to the first point in the first frame, and is an area formed by a plurality of second points on the epipolar line, for example. Specifically, the second points are second pixels included in the search area.

Note that, for each of the plurality of first pixels, restorer 141 may search for a similar point (similar pixel) that is similar to the first pixel in a plurality of second pixels included in the second frame. The plurality of second pixels are all the pixels included in the second frame, for example. Alternatively, restorer 141 may search each of the plurality of second frames for a similar point that is similar to the first pixel, or may search at least one of the plurality of second frames for a similar point that is similar to the first pixel.

FIG. 3 is a diagram for describing search processing by restorer 141. FIG. 3 illustrates an example in which imaging device 301 at first viewpoint V1 shoots first frame 531 containing subject 510, imaging device 301 at second viewpoint V2 shoots second frame 532 containing subject 510, and imaging device 301 at third viewpoint V3 shoots second frame 533 containing subject 510.

For each first pixel, restorer 141 calculates an epipolar line that is a straight line connecting the position of imaging device 301 having shot the first frame and the two-dimensional coordinates of the first pixel in the first frame projected onto the second frame to be processed. For example, as illustrated in FIG. 3, restorer 141 calculates epipolar line 552 that is straight line L1 connecting first viewpoint V1 and first pixel 541 projected onto second frame 532. Restorer 141 also calculates epipolar line 553 that is straight line L1 projected onto second frame 533. Restorer 141 then searches for a similar point that is similar to first pixel 541 to be processed in first frame 531 from epipolar lines 552 and 553 in second frames 532 and 533.

Restorer 141 calculates a degree of similarity between the first pixel and each of the second pixels in the search area. As the degree of similarity, restorer 141 calculates N(I, J), which indicates a normalized cross correlation (NCC) between small areas of the first frame and the second frame to be processed, according to Equation 1. N(I, J) is expressed by a numerical value from −1 to 1, and indicates a higher degree of similarity as N(I, J) comes closer to 1.

[Math. 1]

$$N(I, J) = \frac{\sum (I_{xy} - \overline{I_{xy}}) \cdot (J_{st} - \overline{J_{st}})}{\sqrt{(I_{xy} - \overline{I_{xy}})^2} \sqrt{(J_{st} - \overline{J_{st}})^2}} \quad \text{(Equation 1)}$$

$I_{xy}$ and $J_{xy}$ indicate a pixel value in a small area in each frame.

$\overline{I}_{xy}$ and $\overline{J}_{xy}$ indicate a pixel average in a small area in each frame.

Restorer 141 may calculate SSD(I, J), instead of NCC, as the degree of similarity. SSD (Sum of Squared Difference) is a sum of squares of differences between pixel values of small areas of the first frame and the second frame to be processed. The smaller the value of SSD(I, J), the higher the degree of similarity is.

[Math. 2]

$$\mathrm{SSD}(I,J)=\Sigma(I_{xy}-J_{st})^2 \quad \text{(Equation 2)}$$

$I_{xy}$ and $J_{st}$ indicate a pixel value in a small area in each frame.

Restorer 141 specifies second pixels 542 and 543 that have the highest degree of similarity to first pixel 541 as similar points to the first pixel. Using first pixel 541 and second pixels 542 and 543 selected as similar points to first pixel 541, restorer 141 calculates a three-dimensional point indicated by three-dimensional coordinates of a point on subject 510 according to the triangulation principle.

When a plurality of three-dimensional points is calculated for one first pixel, restorer 141 may generate one three-dimensional point corresponding to the one first pixel by calculating an average of the three-dimensional points.

Note that when camera identification information is not added to each of the plurality of frames, the camera identification information being about imaging device 301 that generated the frame, restorer 141 may add, to a header of each frame, camera identification information of imaging device 301 that generated the frame, or may add a plurality of items of camera identification information of a plurality of imaging devices 301 to a header of a frame set including a plurality of frames. The camera identification information may include identification information that identifies imaging device 301 corresponding to the camera identification information, or may include a camera parameter of imaging device 301 corresponding to the camera identification information.

Figure 4:
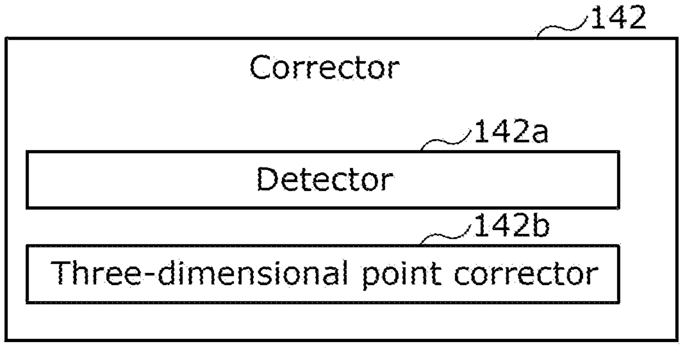
FIG. 4 is a block diagram illustrating the functional configuration of a corrector according to Embodiment 1.

FIG. 4 is a block diagram illustrating a functional configuration of corrector 142.

As illustrated in FIG. 4, corrector 142 has detector **142*a* and three-dimensional point corrector 142*b***.

Detector **142*a* detects, in at least the first frame, a line that is composed of a series of edges and corresponds to a contour of subject 510. The line detected in the first frame is an example of a first line. Specifically, detector 142***a* may detect edges using the gradient method, which uses the first-order differentiation for a pixel value of each pixel of the first frame. Alternatively, detector 142*a* may detect edges using the Laplacian method, which uses the second-order differentiation for a pixel value of each pixel of the first frame. Note that the edges detected by detector 142*a* are points (edge points) in the first frame.

Detector 142*a* also detects a series of edges from a plurality of edges detected on the first frame. Detector 142*a* can use any well-known algorithm to detect a series of edges. For example, detector 142*a* can use LSD (Line Segment Detector) to detect a series of straight edges. When using LSD, detector 142*a* detects a start point and an end point of the series of edges and detects a straight line connecting the start point and the end point as a series of edges. Note that the algorithm for detecting a series of straight edges is not limited to LSD.

The contour to which the line detected by detector 142*a* corresponds is a line segment, a curve, a plane, or a curved face, for example. The contour may be a line or face forming a part of a particular shape. The particular shape may be a rectangular column, a pyramid, a cone, or a sphere, for example, or may be a three-dimensional shape formed by rotating a line segment or curve about a rotation axis, that is, a body of rotation.

The contours may be classified based on the type of the line shape. The line shape may be a straight line (line segment) connecting two points or a curve connecting two points. The curve connecting two points may be a smooth curve having no bend. As can be seen, the line detected by detector 142*a* may be a line having a finite length defined by two points. When the contour is a face, the contour may be a face including a detected line. The contour may be a plane when the shape of the detected line is a line segment, or may be a curved face when the shape of the detected line is a curved line.

Figure 5:
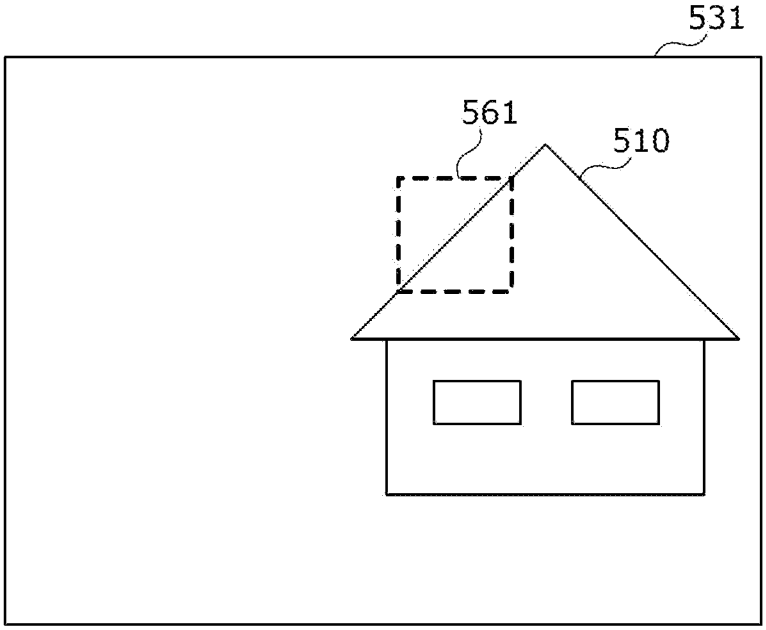
FIG. 5 is a diagram for describing an example of processing for detecting a contour according to Embodiment 1.
Figure 6:
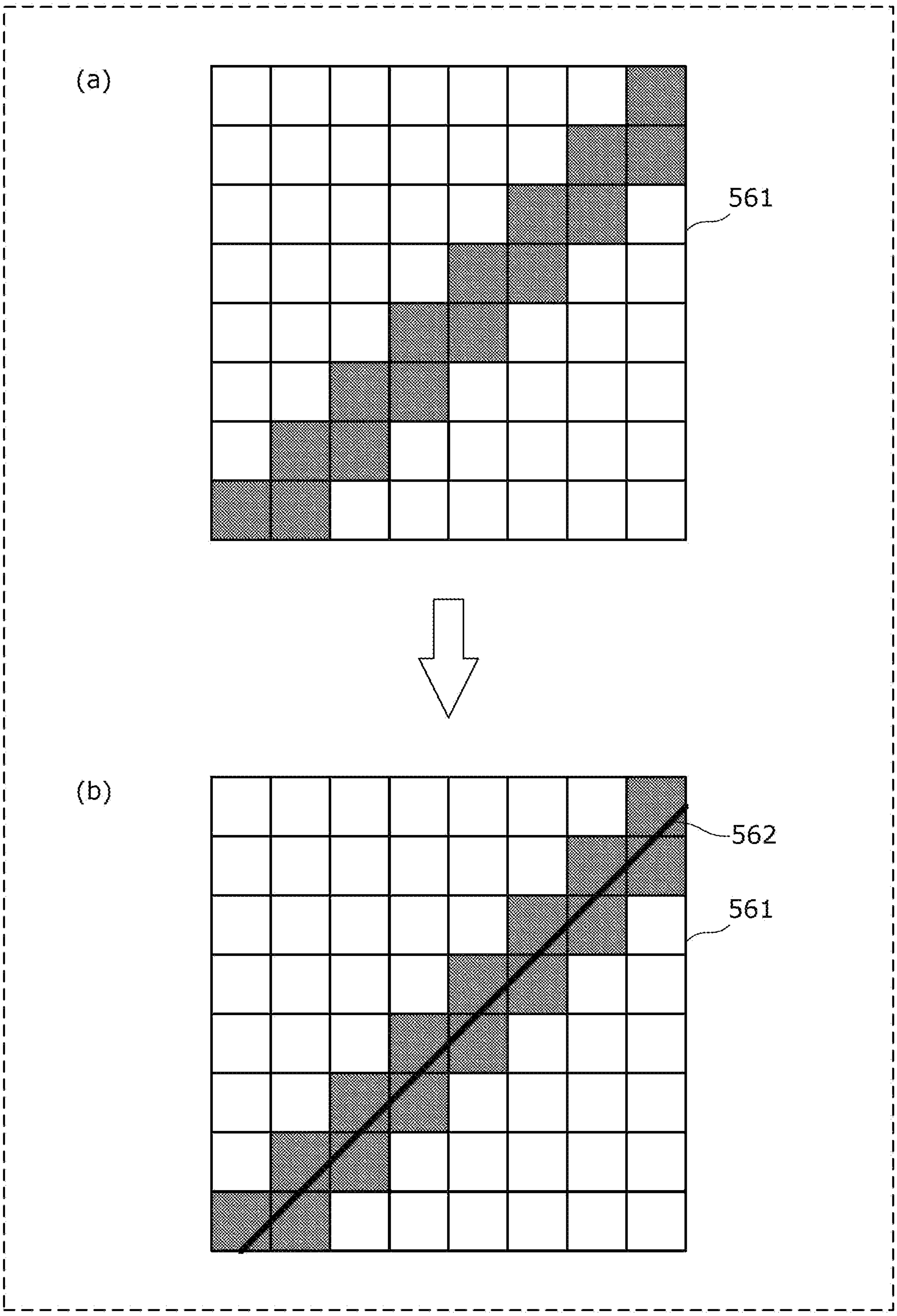
FIG. 6 is a diagram for describing an example of processing for detecting a contour according to Embodiment 1.

FIGS. 5 and 6 are diagrams for describing an example of processing in which detector 142*a* detects a line. In the following, an example in which detector 142*a* detects a line segment will be described.

Referring to FIG. 5, in first frame 531, area 561 including a straight line-shaped element of subject 510 is shown. In first frame 531, in order to represent subject 510 on a pixel basis, the contour of subject 510 is also represented on a pixel basis. Therefore, in general, in area 561 including a straight line-shaped element extending obliquely in first frame 531, significant aliasing occurs and the edge has a step-like appearance, as illustrated in Part (a) of FIG. 6. However, the detected series of edges are not represented on a pixel basis, and therefore, the contour of subject 510 is represented by the series of edges with high reproducibility. In other words, the positions of the detected series of edges are specified by the first-order differentiation or second-order differentiation on a luminance gradient determined from a relationship between the positions of the pixels and the pixel values, and therefore, the positions of the detected series of edges are not limited to the positions of the pixels but are specified with an accuracy (fractional pixel accuracy) based on a smaller area than a pixel. That is, detector 142*a* detects a line composed of a series of edges at a position with the fractional pixel accuracy. The line composed of a series of edges is represented in units smaller than the pixels in first frame 531. Therefore, the series of edges represent contour 562 in units of a smaller area than a pixel, which provides a higher reproducibility. Since detector 142*a* detects the series of edges using the first-order differentiation or second-order differentiation on the luminance gradient, detector 142*a* can provide a result with a folding distortion (aliasing) of pixels cancelled.

Therefore, a three-dimensional point can be generated with higher accuracy by generating the three-dimensional point using a series of edges that can represent a contour of subject 510 with higher reproducibility, rather than by generating the three-dimensional point from only the pixels of first frame 531.

Three-dimensional point corrector 142*b* specifies a group including a plurality of third three-dimensional points included in a contour corresponding to line 562 among the plurality of second three-dimensional points. The group may include, as the plurality of third three-dimensional points, a plurality of three-dimensional points generated from a plurality of pixels through which line 562 passes in the first frame. Alternatively, the group may include, as the plurality of third three-dimensional points, a plurality of three-dimensional points generated from a plurality of pixels through which line 562 passes in the first frame and pixels around the plurality of pixels. The pixels around the plurality of pixels may include all of a plurality of pixels located within a range of a predetermined number of pixels from the plurality of pixels. In this way, for each of one or more lines detected by detector 142*a*, three-dimensional point corrector 142*b* specifies a group including a plurality of third three-dimensional points specified by a part corresponding to the line.

Based on each line, three-dimensional point corrector 142*b* then corrects the positions of the plurality of third three-dimensional points belonging to the group specified by the line. Specifically, three-dimensional point corrector 142*b* specifies a plane for each group by performing principal component analysis on the plurality of third three-dimensional points belonging to the group, and corrects the positions of the plurality of third three-dimensional points so that the third three-dimensional points come closer to the plane. In this way, three-dimensional point corrector 142*b* corrects the positions of the plurality of third three-dimensional points corresponding to the contour among the plurality of second three-dimensional points. In this way, the plurality of first three-dimensional points are generated.

Figure 7:
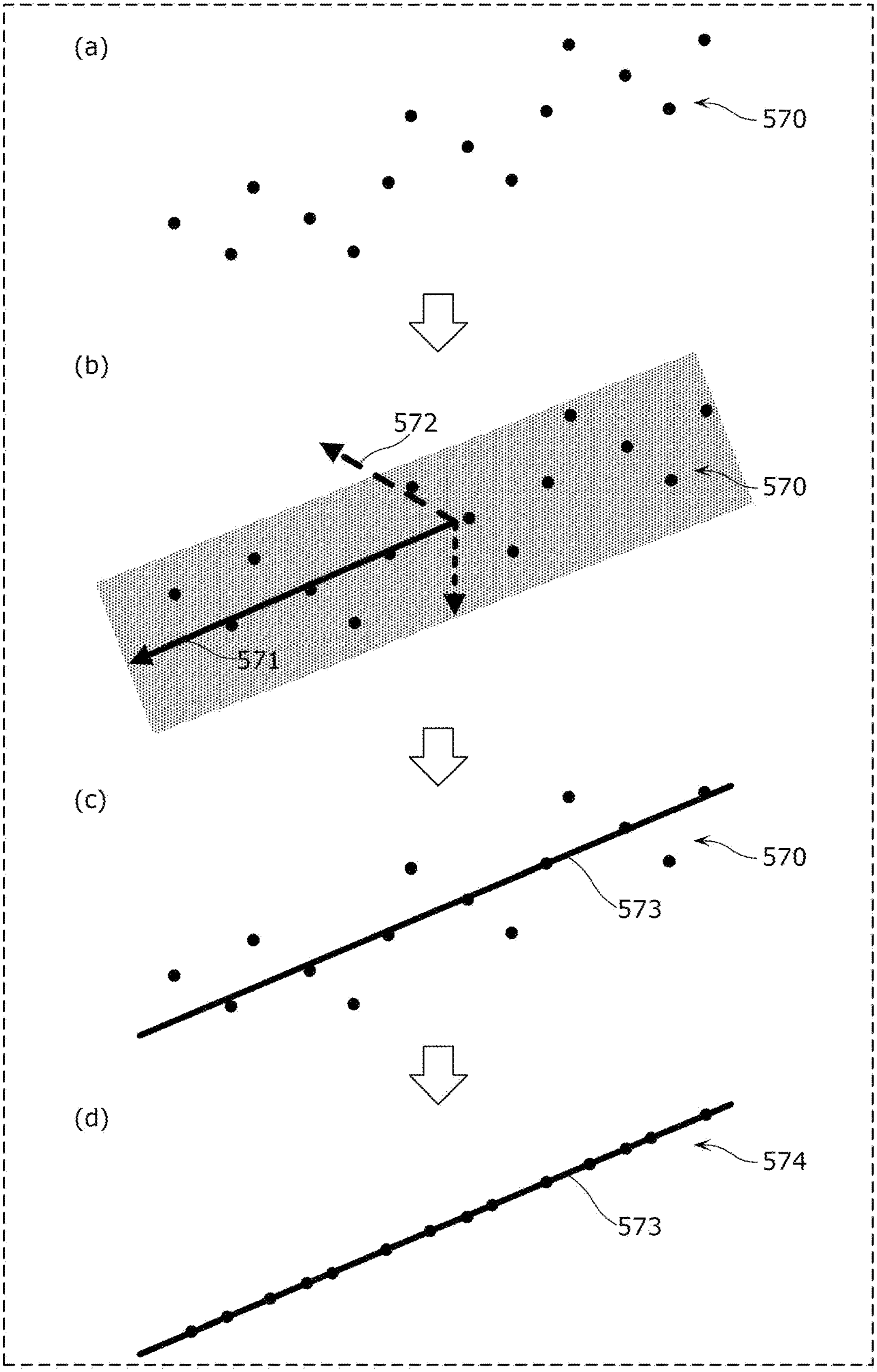
FIG. 7 is a diagram for describing an example of processing for correcting positions of third three-dimensional points according to Embodiment 1.

FIG. 7 is a diagram for describing an example of processing in which three-dimensional point corrector 142*b* corrects positions of a plurality of third three-dimensional points according to Embodiment 1. Part (a) of FIG. 7 illustrates a plurality of third three-dimensional points 570 belonging to one group.

Three-dimensional point corrector 142*b* calculates first principal component 571 and second principal component 572 illustrated in Part (b) of FIG. 7 by performing principal component analysis on the plurality of third three-dimensional points 570. Specifically, three-dimensional point corrector 142*b* calculates a variance-covariance matrix of the three-dimensional coordinates of the plurality of third three-dimensional points 570, and calculates, as first principal component 571 and second principal component 572, two principal components (eigenvectors) having the greatest and the second greatest magnitude.

Three-dimensional point corrector 142*b* then generates a first plane based on first principal component 571 and a second plane based on second principal component 572 as candidates of planes (candidate planes) used for correction. The first plane is a plane that passes through the center of gravity of the plurality of third three-dimensional points 570 and has first principal component 571 as a normal line. The second plane is a plane that passes through the center of gravity of the plurality of third three-dimensional points 570 and has second principal component 572 as a normal line. Three-dimensional point corrector 142*b* determines, as a plane used for correction, one of the first plane and the second plane that has the smaller sum of the distances from the plurality of third three-dimensional points 570. Here, the formula representing the candidate plane is expressed by Equation 3.

$$ax+by+cz+d=0 \quad \text{(Equation 3)}$$

In this case, distance D between this plane and a point (x0, y0, z0) is expressed by Equation 4.

[Math. 3]

$$D = \frac{|ax_0 + by_0 + cz_0 + d|}{\sqrt{a^2 + b^2 + c^2}} \quad \text{(Equation 4)}$$

Provided that the number of the third three-dimensional points belonging to the group is n, and the three-dimensional coordinates of an i-th three-dimensional point are (xi, yi, zi), sum $D_{all}$ of the distances between n third three-dimensional points and the candidate plane is expressed by Equation 5.

[Math. 4]

$$D_{all} = \sum_{i=1}^{n} \frac{|ax_i + by_i + cz_i + d|}{\sqrt{a^2 + b^2 + c^2}} \quad \text{(Equation 5)}$$

Three-dimensional point corrector 142*b* calculates $D_{all}$ for each of the first plane and the second plane, and determines the plane having the smallest $D_{all}$ as correction plane 573. As a result, in the example illustrated in Part (c) of FIG. 7, three-dimensional point corrector 142*b* determines the first plane based on first principal component 571 as correction plane 573.

After determining the correction plane, as illustrated in Part (d) of FIG. 7, for each of the plurality of third three-dimensional points 570, three-dimensional point corrector 142*b* calculates, as corrected point 574, an intersection of correction plane 573 and a projected line of the pixel on the first frame corresponding to the third three-dimensional point onto the third three-dimensional point.

Here, provided that a three-dimensional unit vector corresponding to the pixel corresponding to each third three-dimensional point is (Vx, Vy, Vz), the third three-dimensional point (Xn, Yn, Zn) corresponding to the pixel can be expressed as (Xn, Yn, Zn)=t(Vx, Vy, Vz).

When the plane is expressed by Equation 3, t is expressed by Equation 6 below.

[Math. 5]

$$t = \frac{-d}{aV_x + bV_y + cV_z} \quad \text{(Equation 6)}$$

A corrected point (X'n, Y'n, Z'n) is expressed by Equation 7 below.

[Math. 6]

$$(X_n', Y_n', Z_n') = \frac{-d}{aV_x + bV_y + cV_z}(V_x, V_y, V_z) \quad \text{(Equation 7)}$$

Note that the three-dimensional unit vector (Vx, Vy, Vz) corresponding to the pixel is expressed by Equation 8 below, provided that the camera is a pinhole camera.

[Math. 7]

$$(V_x, V_y, V_z) = \left(\frac{(x - c_x)}{f_x}, \frac{(y - c_y)}{fy}, 1\right) \quad \text{(Equation 8)}$$

In Equation 8, (x, y) are two-dimensional coordinates of a pixel in the first frame. (cx, cy) are a central position of the first frame in the internal parameter of imaging device 301 that shoots the first frame. (fx, fy) are a focal length in the internal parameter of imaging device 301 that shoots the first frame.

As described above, three-dimensional point corrector 142*b* generates a first three-dimensional model including a plurality of corrected points 574 by correcting the positions of the plurality of third three-dimensional points 570. As a result, the plurality of corrected points 574 are arranged along the line detected in the first frame. Therefore, when viewed from the viewpoint of the first frame, in the generated first three-dimensional model, the part corresponding to the line detected in the first frame has a shape along the line. In addition, since the plurality of first three-dimensional points are generated as a result of the correction of the plurality of third three-dimensional points 570, the plurality of first three-dimensional points include the plurality of corrected points 574. That is, the plurality of first three-dimensional points include a plurality of second three-dimensional points that are not corrected among the plurality of second three-dimensional points and the plurality of corrected points 574.

Operation of Three-Dimensional Model Generation Device

Figure 8:
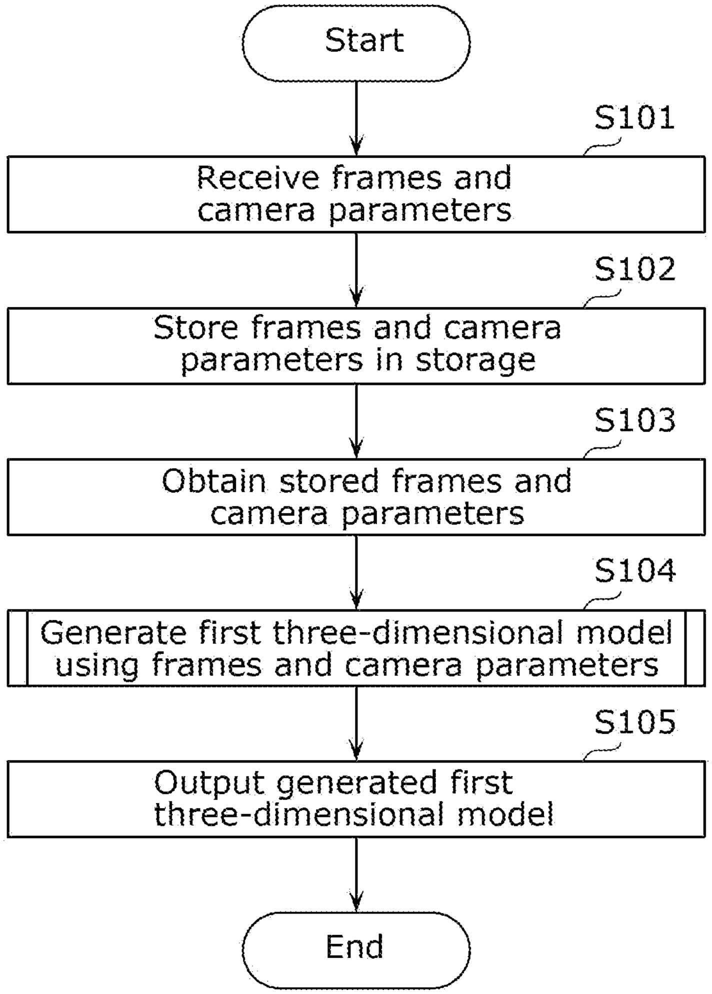
FIG. 8 is a flowchart illustrating an example of the operation of a three-dimensional model generation device according to Embodiment 1.

Next, an operation of three-dimensional model generation device 100 will be described with reference to FIG. 8. FIG. 8 is a flowchart illustrating an example of the operation of three-dimensional model generation device 100.

In three-dimensional model generation device 100, first, receiver 110 receives, from estimation device 200, a plurality of frames shot by a plurality of imaging devices 301 and a camera parameter of each imaging device 301 (S101). Step S101 is an example of a step of obtaining a plurality of images. Receiver 110 need not receive the frames and the camera parameters at one timing, and may receive the frames and the camera parameters at different timings. That is, the obtaining of the frames and the obtaining of the camera parameters may be performed at the same timing or at different timings.

Storage 120 then stores the frames shot by imaging devices 301 and the camera parameter of each imaging device 301 received by receiver 110 (S102).

Obtainer 130 then obtains the frames and the camera parameters stored in storage 120, and outputs the frames and camera parameters obtained to generator 140 (S103).

Generator 140 then generates a first three-dimensional model using the frames and the camera parameters (S104). Details of step S104 of generating a first three-dimensional model will be described later with reference to FIG. 9.

Outputter 150 then outputs the first three-dimensional model generated by generator 140 (S105).

Figure 9:
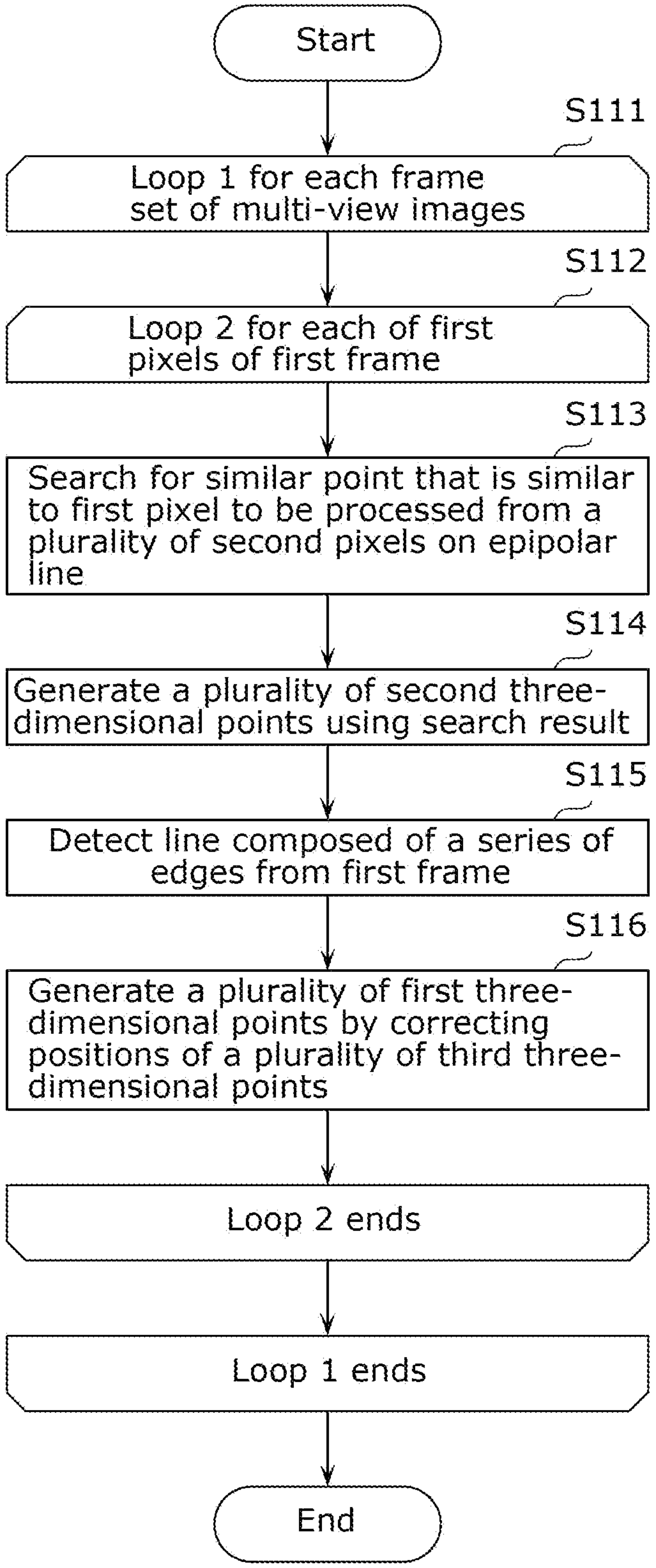
FIG. 9 is a flowchart illustrating an example of details of the generation processing in step S104 according to Embodiment 1.

FIG. 9 is a flowchart illustrating an example of details of the generation processing in step S104 by generator 140.

Generator 140 performs loop 1 for each set of frames of a multi-view image shot at a corresponding timing (S111). In loop 1, loop 2 is performed for each set of frames.

Generator 140 performs loop 2 for each first pixel in a first frame of a set of frames to be processed (S112). In loop 2, a process from step S113 to step S116 is performed for each first pixel.

For a first pixel to be processed, restorer 141 searches for a similar point that is similar to the first pixel from a plurality of second pixels on an epipolar line associated with the first pixel in a plurality of second frames of the set of frames to be processed (S113).

Restorer 141 generates second three-dimensional points by performing triangulation using the search results obtained in step S113. With this, restorer 141 generates a second three-dimensional model including a plurality of second three-dimensional points. Since details of step S113 and S114 have already been described in the description of restorer 141, description thereof will be omitted.

Corrector 142 detects, from the first frame, a line that is composed of a series of edges and corresponds to a contour of a subject (S115).

Corrector 142 corrects the positions of a plurality of third three-dimensional points corresponding to the detected line among the plurality of second three-dimensional points according to the shape of the line (S116). In this way, corrector 142 generates a first three-dimensional model including a plurality of first three-dimensional points. Steps S115 and S116 have been described in detail in the description of corrector 142, and therefore, descriptions thereof will be omitted.

Loop 2 ends when the process from step S113 to step S116 ends for all the first pixels included in the first frame of the set of frames to be processed.

Loop 1 ends when loop 2 ends for all the sets of frames.

Note that although, in the example in FIG. 9, loop 2 includes processing for generating a second three-dimensional model and processing for correcting the positions of a plurality of third three-dimensional points, the present invention is not limited thereto, and these two processings need not be included in the same loop. In other words, a loop of processing for generating a second three-dimensional model and a loop of processing for correcting a plurality of third three-dimensional points may be independently provided.

Advantageous Effects, Etc

A three-dimensional model generation method according to the present embodiment includes: obtaining a first frame generated by shooting a subject from a first viewpoint and a second frame generated by shooting the subject from a second viewpoint (S101); detecting, in at least the first frame, a line composed of a series of edges and corresponding to a contour of the subject (S115); and generating first three-dimensional points representing the contour in a three-dimensional space in a computer, based on the first frame, the second frame, and the line (S116).

According to the three-dimensional model generation method, a line corresponding to a contour of a subject is detected in a frame, and a plurality of first three-dimensional points are generated using not only a plurality of frames but also the detected line. Since a plurality of first three-dimensional points are generated by detecting a line corresponding to a contour of a subject and taking the line into consideration, an error due to aliasing on the images can be reduced. Therefore, the generation accuracy of the first three-dimensional model can be improved.

Furthermore, in the three-dimensional model generation method according to this embodiment, the contour represented by the plurality of first three-dimensional points in the three-dimensional space in the computer viewed from a viewpoint corresponding to the first viewpoint has a shape along a line. That is, according to the three-dimensional model generation method, since the plurality of first three-dimensional points are generated so as to along the shape of the contour of the subject viewed from the first viewpoint, the generation accuracy of the first three-dimensional model can be improved.

Furthermore, in the three-dimensional model generation method according to this embodiment, a plurality of second three-dimensional points representing the subject in the three-dimensional space in the computer are generated (S113, S114) by performing matching by searching for a similar point in the first frame and the second frame, a plurality of third three-dimensional points corresponding to the contour are specified among the plurality of second three-dimensional points based on the line for generation of a plurality of first three-dimensional points (S116), and the positions of the plurality of third three-dimensional points are corrected.

Accordingly, the third three-dimensional points are specified as a point cloud corresponding to the contour, and the position of a point cloud is corrected using the point cloud specified. For this reason, the position of a point cloud can be appropriately corrected according to the shape of the contour.

Furthermore, in the three-dimensional model generation method according to this embodiment, for generation of the plurality of first three-dimensional points (S116), a plane is generated by performing principal component analysis on the plurality of third three-dimensional points, and the positions of the plurality of third three-dimensional points are corrected so that the plurality of third three-dimensional points come closer to the plane. Therefore, the positions of the plurality of third three-dimensional points can be accurately corrected according to the shape of the contour.

Furthermore, in the three-dimensional model generation method according to this embodiment, for generation of the plurality of first three-dimensional points (S116), among a first plane that passes through the center of gravity of the plurality of third three-dimensional points and has a first principal component obtained by the principal component analysis as a normal line and a second plane that passes through the center of gravity and has a second principal component obtained by the principal component analysis as a normal line, a plane having the smaller sum of the distances from the plurality of third three-dimensional points is generated as a plane used for correction. Therefore, even when the length of the detected line is not sufficiently long, the positions of the plurality of third three-dimensional points can be accurately corrected according to the line that is a line segment.

VARIATIONS

Variation 1

In the three-dimensional model generation method according to Embodiment 1 described above, three-dimensional model generation device 100 generates a correction plane by performing principal component analysis on a plurality of third three-dimensional points belonging to a group specified by a line, and corrects the positions of the plurality of third three-dimensional points using the correction plane. However, the present invention is not limited to this. In a three-dimensional model generation method according to Variation 1, an approximate line may be generated by performing the least square method on the plurality of third three-dimensional points, and the positions of the plurality of third three-dimensional points may be corrected using the approximate line.

In this case, processing in three-dimensional point corrector 142*b* in corrector 142 is different, so that the processing in three-dimensional point corrector 142*b* will be described.

As in Embodiment 1, three-dimensional point corrector 142*b* specifies a group including a plurality of third three-dimensional points included in a part corresponding to line 562 among a plurality of second three-dimensional points. Three-dimensional point corrector 142*b* then generates an approximate line by performing the least square method on the plurality of third three-dimensional points. Three-dimensional point corrector 142*b* corrects the positions of the plurality of third three-dimensional points so that the third three-dimensional points come closer to the approximate line.

Figure 10:
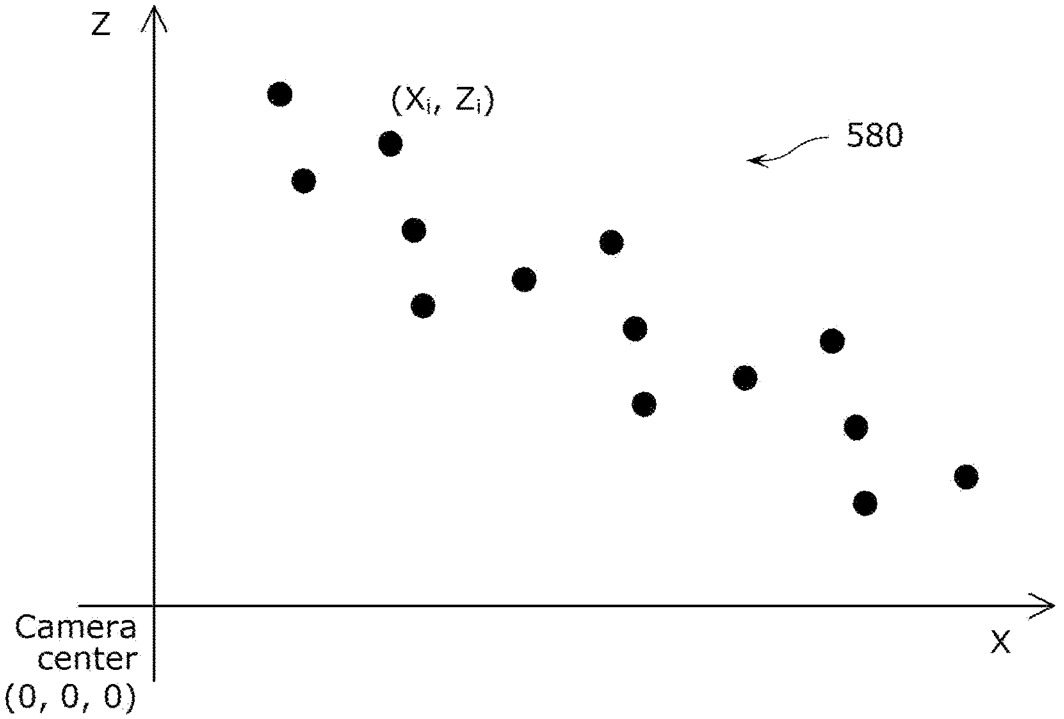
FIG. 10 is a diagram for describing an example of processing for correcting positions of third three-dimensional points according to Variation 1 of Embodiment 1.

FIGS. 10 to 13 are diagrams for describing an example of processing in which three-dimensional point corrector 142*b* corrects the positions of a plurality of third three-dimensional points according to a variation of Embodiment 1. FIG. 10 illustrates a plurality of third three-dimensional points 580 belonging to one group.

As illustrated in FIG. 10, three-dimensional point corrector 142*b* projects a plurality of third three-dimensional points 580 onto an XZ plane. It is assumed that the number of the plurality of third three-dimensional points 580 belonging to the group is n, and the three-dimensional coordinates of an i-th three-dimensional point on the XZ plane are (Xi, Zi). It is also assumed that the approximate line to be determined is expressed by Equation 9.

$$Z=aX+b \qquad \text{(Equation 9)}$$

Then, three-dimensional point corrector 142*b* can calculate a and b by the least square method according to Equation 10 below.

[Math. 8]

$$a = \frac{n\sum_{i=1}^{n} X_i Z_i - \sum_{i=1}^{n} X_i \sum_{i=1}^{n} Z_i}{n\sum_{i=1}^{n} X_i^2 - \left(\sum_{i=1}^{n} X_i\right)^2} \qquad \text{(Equation 10)}$$

$$b = \frac{\sum_{i=1}^{n} X_i^2 \sum_{i=1}^{n} Z_i - \sum_{i=1}^{n} X_i Z_i \sum_{i=1}^{n} X_i}{n\sum_{i=1}^{n} X_i^2 - \left(\sum_{i=1}^{n} X_i\right)^2}$$

Figure 11:
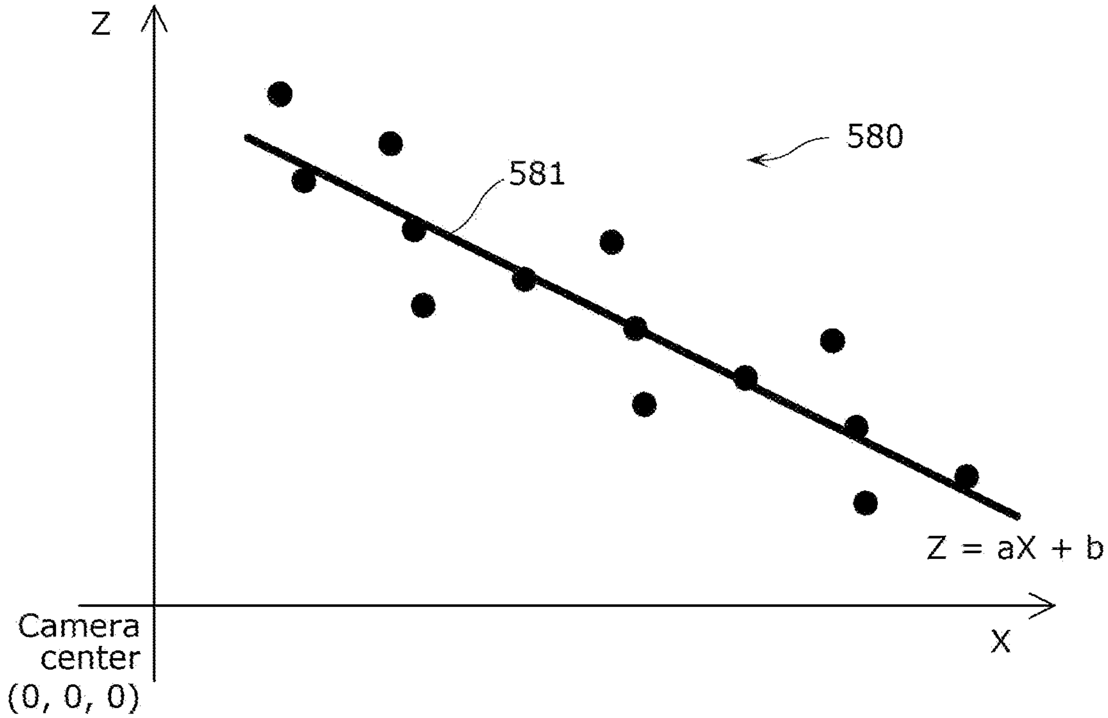
FIG. 11 is a diagram for describing an example of processing for correcting positions of third three-dimensional points according to Variation 1 of Embodiment 1.

As illustrated in FIG. 11, three-dimensional point corrector 142*b* can generate approximate line 581 of the plurality of third three-dimensional points 580 using the least square method on the plurality of third three-dimensional points 580 on the XZ plane, provided that the two-dimensional plane including the plurality of third three-dimensional points 580 is the XZ plane.

Figure 12:
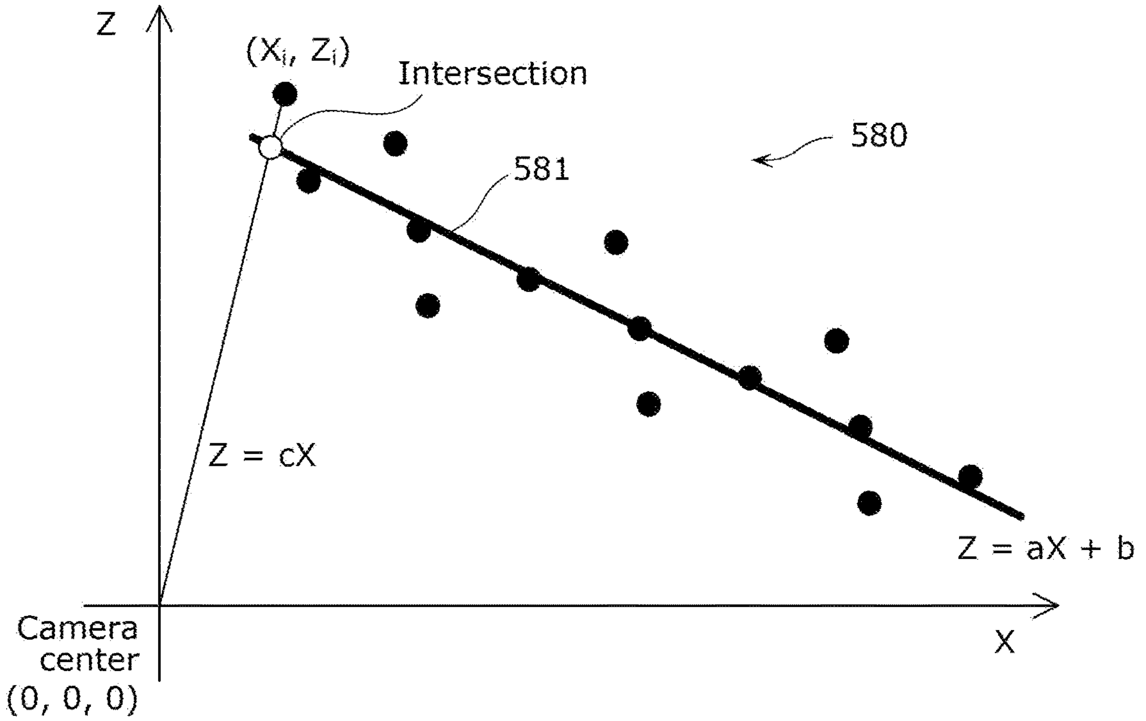
FIG. 12 is a diagram for describing an example of processing for correcting positions of third three-dimensional points according to Variation 1 of Embodiment 1.

As illustrated in FIG. 12, three-dimensional point corrector 142*b* then calculates, as a corrected point, an intersection of approximate line 581 and a straight line connecting the viewpoint from which the first frame is shot and the i-th third three-dimensional point. Specifically, provided that a straight line that extends from the camera center of imaging device 301 that shoots the first frame and passes through a corrected point ($X'_i$, $Y'_i$, $Z'_i$) is Z=cX on the XZ plane, three-dimensional point corrector 142*b* calculates an intersection ($X'_i$, $Z'_i$) of this straight line and the approximate line, and this intersection ($X'_i$, $Z'_i$) is expressed by Equation 11.

[Math. 9]

$$(X_i', Z_i') = \left(-\frac{b}{a-c}, -\frac{bc}{a-c}\right) \qquad \text{(Equation 11)}$$

In this way, three-dimensional point corrector 142*b* calculates the intersection with approximate line 581 for each third three-dimensional point. Three-dimensional point corrector 142*b* calculates the Y coordinate of the corrected point on the XYZ coordinate system using the calculated coordinates of the intersection and Equation 12.

$$Y'_i=n_xX'_i+n_zZ'_i \qquad \text{(Equation 12)}$$

Here, the straight line that extends from the camera center of imaging device 301 and passes through the corrected point is expressed by Equation 13.

[Math. 10]

$$Z = \left(\frac{Z_i'}{X_i'}\right)X \qquad \text{(Equation 13)}$$

When the straight line has no width, it means that the plurality of third three-dimensional points are on the same plane. Here, a three-dimensional unit vector corresponding to the pixel corresponding to the i-th third three-dimensional point is expressed by Equation 14.

[Math. 11]

$$\vec{V}_i=(V_{xi}, V_{yi}, V_{zi}) \qquad \text{(Equation 14)}$$

$\vec{V}_i$ is the ith three-dimensional unit vector

Figure 13:
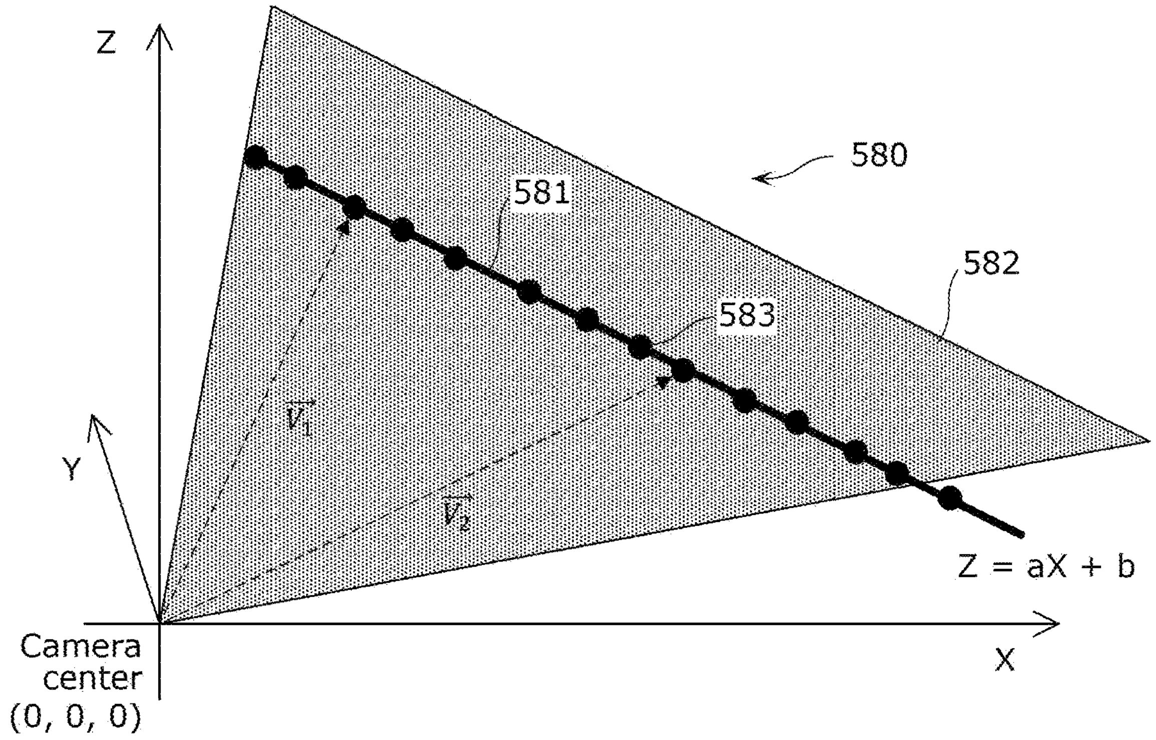
FIG. 13 is a diagram for describing an example of processing for correcting positions of third three-dimensional points according to Variation 1 of Embodiment 1.

In this case, as illustrated in FIG. 13, three-dimensional point corrector 142*b* calculates plane 582 by sampling two points among the plurality of third three-dimensional points. The normal line of plane 582 is expressed by Equation 15, and the plane is expressed by Equation 16.

[Math. 12]

$$\vec{n}=(n_x, n_y, n_z) \qquad \text{(Equation 15)}$$

$\vec{n}$ is the normal line of a plane $$n_xx+n_yy+n_zz=0 \qquad \text{(Equation 16)}$$

Note that as illustrated in Equation 17, the normal line can be determined as a vector outer product.

[Math. 13]

$$\vec{n}=\vec{V}_1\times\vec{V}_2 \qquad \text{(Equation 17)}$$

$\vec{n}$ is the normal line of a plane

In this way, three-dimensional point corrector 142*b* generates a first three-dimensional model including a plurality of corrected points 583 by correcting the positions of the plurality of third three-dimensional points 580. As a result, the plurality of corrected points 583 are arranged along the line detected in the first frame. Therefore, in the generated first three-dimensional model, the contour represented by the plurality of first three-dimensional points in the three-dimensional space in the computer viewed from the viewpoint corresponding to the first viewpoint has a shape along the line. In addition, since the plurality of first three-dimensional points are generated as a result of the correction of the plurality of third three-dimensional points 580, the plurality of first three-dimensional points include the plurality of corrected points 583. That is, the plurality of first three-dimensional points include a plurality of second three-dimensional points that are not corrected among the plurality of second three-dimensional points and the plurality of corrected points 583.

Furthermore, in the three-dimensional model generation method according to this variation, for generation of the first three-dimensional model (S116), an approximate line is generated by performing the least square method on the plurality of third three-dimensional points, and the positions of the plurality of third three-dimensional points are corrected so that the plurality of third three-dimensional points come closer to the approximate line. Therefore, the positions of the plurality of third three-dimensional points can be accurately corrected according to the approximate line that is approximate to the point cloud.

Variation 2

Variation 2 will be described.

According to a three-dimensional model generation method according to Variation 2, three-dimensional model generation device 100 may generate a plane for correction using a plurality of third three-dimensional points already corrected. In this case, processing in corrector 142 is different, so that the processing in corrector 142 will be described.

Figure 14:
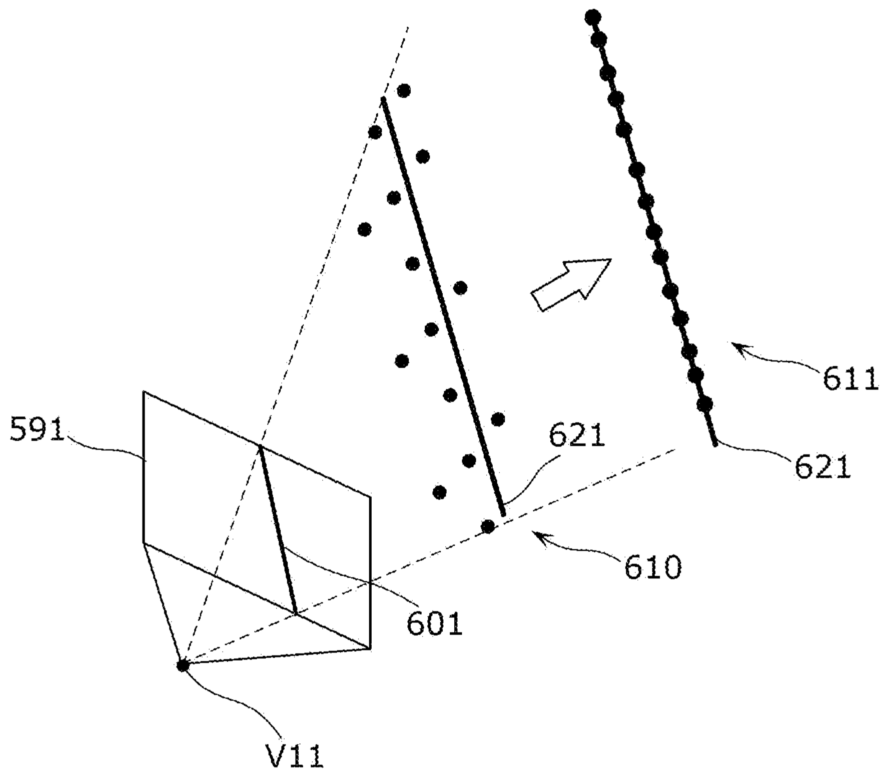
FIG. 14 is a diagram for describing an example an operation by the corrector according to Variation 2 of Embodiment 1.
Figure 15:
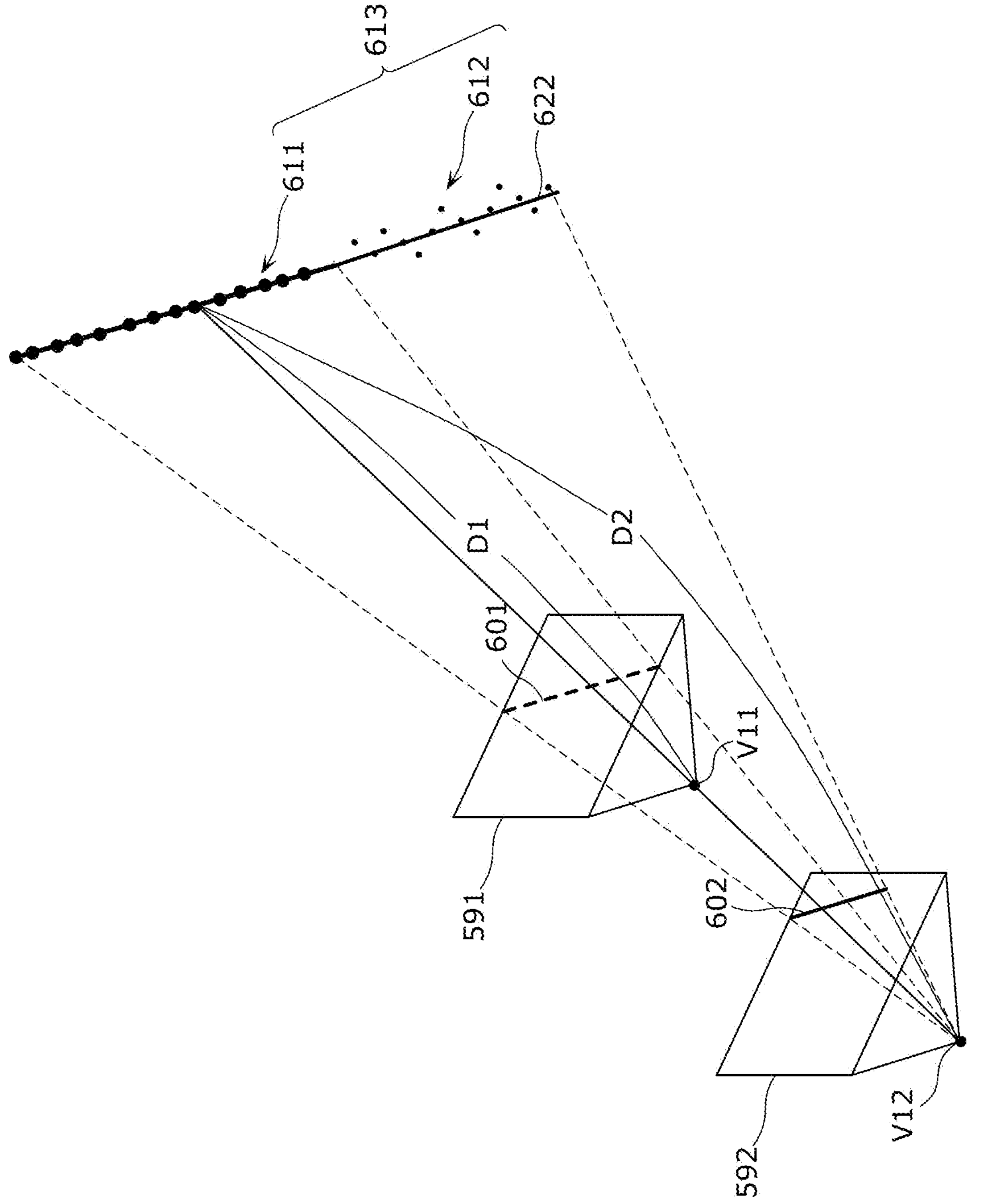
FIG. 15 is a diagram for describing an example an operation by the corrector according to Variation 2 of Embodiment 1.

FIG. 14 is a diagram for describing an example of processing in corrector 142 according to Variation 2 of Embodiment 1. FIG. 15 is a diagram for describing an example of processing in corrector 142 according to Variation 2 of Embodiment 1.

Detector 142*a* of corrector 142 detects, in first frame 591, line 601 that is composed of a series of edges and corresponds to a contour of a subject. Detector 142*a* then detects, in second frame 592, line 602 that is composed of a series of edges and corresponds to the contour of the subject. Line 602 corresponds to a contour including at least a part of the contour of the subject to which line 601 corresponds. That is, the contour to which line 602 corresponds and the contour to which line 601 corresponds include an overlapping part. Note that line 601 corresponds to the first line, and line 602 corresponds to the second line.

Specifically, detector 142*a* detects lines corresponding to a contour of a subject in second frame 592, compares the detected lines with line 601, and detects, as line 602, a line having a degree of matching with line 601 higher than a predetermined degree of matching among the detected lines. The degree of matching between the detected line and line 601 may be the degree of similarity between the normal vector of the detected line and the normal vector of line 601. Alternatively, rather than being detected based on the degree of similarity between the normal vectors, the degree of matching may be calculated based on the distance between the position of the detected line in the three-dimensional space and the position of line 601 in the three-dimensional space. In that case, the shorter the distance, the higher the calculated degree of matching is. The degree of similarity can be calculated in well-known method.

Three-dimensional point corrector 142*b* specifies a first group including a plurality of third three-dimensional points 610 included in the contour corresponding to line 601 among the plurality of second three-dimensional points. In this way, for each of one or more lines 601 detected in first frame 591 by detector 142*a*, three-dimensional point corrector 142*b* specifies a group including a plurality of third three-dimensional points 610 specified by a part corresponding to line 601.

Based on each line 601, three-dimensional point corrector 142*b* then corrects the positions of the plurality of third three-dimensional points 610 belonging to the first group specified by line 601. Specifically, three-dimensional point corrector 142*b* specifies plane 621 for each first group by performing principal component analysis on the plurality of third three-dimensional points 601 belonging to the first group, and corrects the positions of the plurality of third three-dimensional points 601 so that the third three-dimensional points 601 come closer to plane 621. In this way, three-dimensional point corrector 142*b* corrects the positions of the plurality of third three-dimensional points 610 corresponding to the contour among the plurality of second three-dimensional points. In this way, the plurality of first three-dimensional points 611 are generated.

Three-dimensional point corrector 142*b* then specifies a plurality of fourth three-dimensional points 613 included in the contour corresponding to line 602, among the plurality of second three-dimensional points. The plurality of fourth three-dimensional points 613 include the plurality of third three-dimensional points 611 corrected and a second three-dimensional points 612 that is not corrected. In this way, for each of one or more lines 602 detected in second frame 592 by detector 142*a*, three-dimensional point corrector 142*b* specifies a second group including the plurality of fourth three-dimensional points 613 specified by a part corresponding to line 602.

Based on each line 602, three-dimensional point corrector 142*b* then corrects the positions of the plurality of fourth three-dimensional points 613 belonging to the second group specified by line 602. Specifically, three-dimensional point corrector 142*b* corrects at least the position of second three-dimensional point 612 that is not corrected among the plurality of fourth three-dimensional points 613. For each second group, three-dimensional point corrector 142*b* specifies plane 622 by performing principal component analysis on the plurality of fourth three-dimensional points 613 belonging to the second group, and corrects the positions of the plurality of fourth three-dimensional points 613 so that the fourth three-dimensional points 613 come closer to specified plane 622. In this process, three-dimensional point corrector 142*b* may correct the positions of all of the plurality of fourth three-dimensional points 613, or may correct only the position of second three-dimensional point 612 that is not corrected among the plurality of fourth three-dimensional points 613.

When distance D1 from first viewpoint V11 to the contour of the subject corresponding to line 601 detected in first frame 591 is shorter than distance D2 from second viewpoint V12 to the contour of the subject corresponding to line 602 detected in second frame 592, three-dimensional point corrector 142*b* may correct at least second three-dimensional point 612 that is not corrected among the plurality of fourth three-dimensional points 613 by using a plane that is an extension of plane 621 specified for correcting the plurality of third three-dimensional points 610.

When one continuous shape of the subject is not contained in one frame but extends over a plurality of frames, if a plurality of first three-dimensional points are generated based on the result of shooting of each frame, the plurality of first three-dimensional points generated may be unable to represent the one continuous shape. According to the three-dimensional model generation method according to Variation 2, the plurality of fourth three-dimensional points 613 including the plurality of third three-dimensional points corrected are used to correct at least the position of second three-dimensional point 612 that is not corrected among the plurality of fourth three-dimensional points 613. That is, since one continuous shape is taken into consideration and at least second three-dimensional point 612 that is not corrected is corrected by using the plurality of third three-dimensional points 610 that are already corrected, the positions of the plurality of first three-dimensional points corresponding to the continuous contour of the subject can be accurately generated.

Embodiment 2

Three-dimensional model generation device 100A according to Embodiment 2 will be described.

Figure 16:
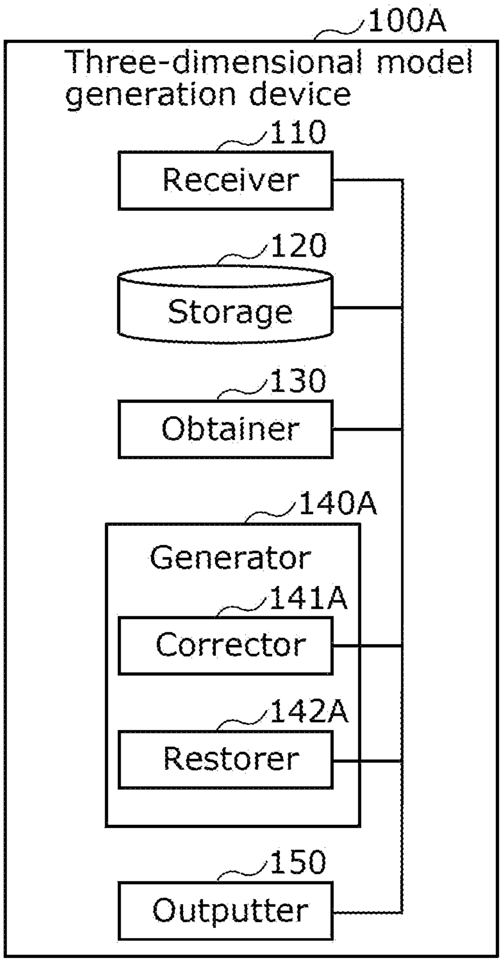
FIG. 16 is a block diagram illustrating the characteristic configuration of a three-dimensional model generation device according to Embodiment 2.

FIG. 16 is a block diagram illustrating a characteristic configuration of three-dimensional model generation device 100A according to Embodiment 2.

Three-dimensional model generation device 100A according to Embodiment 2 is different from three-dimensional model generation device 100 according to Embodiment 1 in the configuration of generator 140A. Therefore, generator 140A will be described. Note that the other components of three-dimensional model generation device 100A than generator 140A are the same as those of three-dimensional model generation device 100 according to Embodiment 1, and therefore denoted by the same reference numerals and will not be further described.

Specifically, generator 140A is different from generator 140 in that after correcting a plurality of frames, the first three-dimensional model is generated by using the plurality of frames corrected. Generator 140A has corrector 141A and restorer 142A. Corrector 141A detects, from each of a plurality of frames, a line that is composed of a series of edges and corresponds to a contour of a subject. Specifically, corrector 141A detects a first line composed of a series of edges in a first frame. Corrector 141A also detects, in a second frame, a second line that is composed of a series of edges. This processing is the same as the processing in which corrector 142 according to Embodiment 1 detects a line in a frame. Corrector 141A then corrects each of the plurality of frames using the line detected in the frame. That is, corrector 141A corrects the first frame and the second frame using the first line and the second line, respectively.

Note that the line detected by corrector 141A may be a straight line (line segment) or a curve. The detected line is not represented by a plurality of pixels. The detected line is specified by a position with the fractional pixel accuracy. The detected line is a line segment connecting the start point and the end point when the line is a line segment, or is a smooth line connecting the start point and the end point when the line is a curve. Corrector 141A can use any well-known algorithm to detect the line composed of a series of edges.

Figure 17:
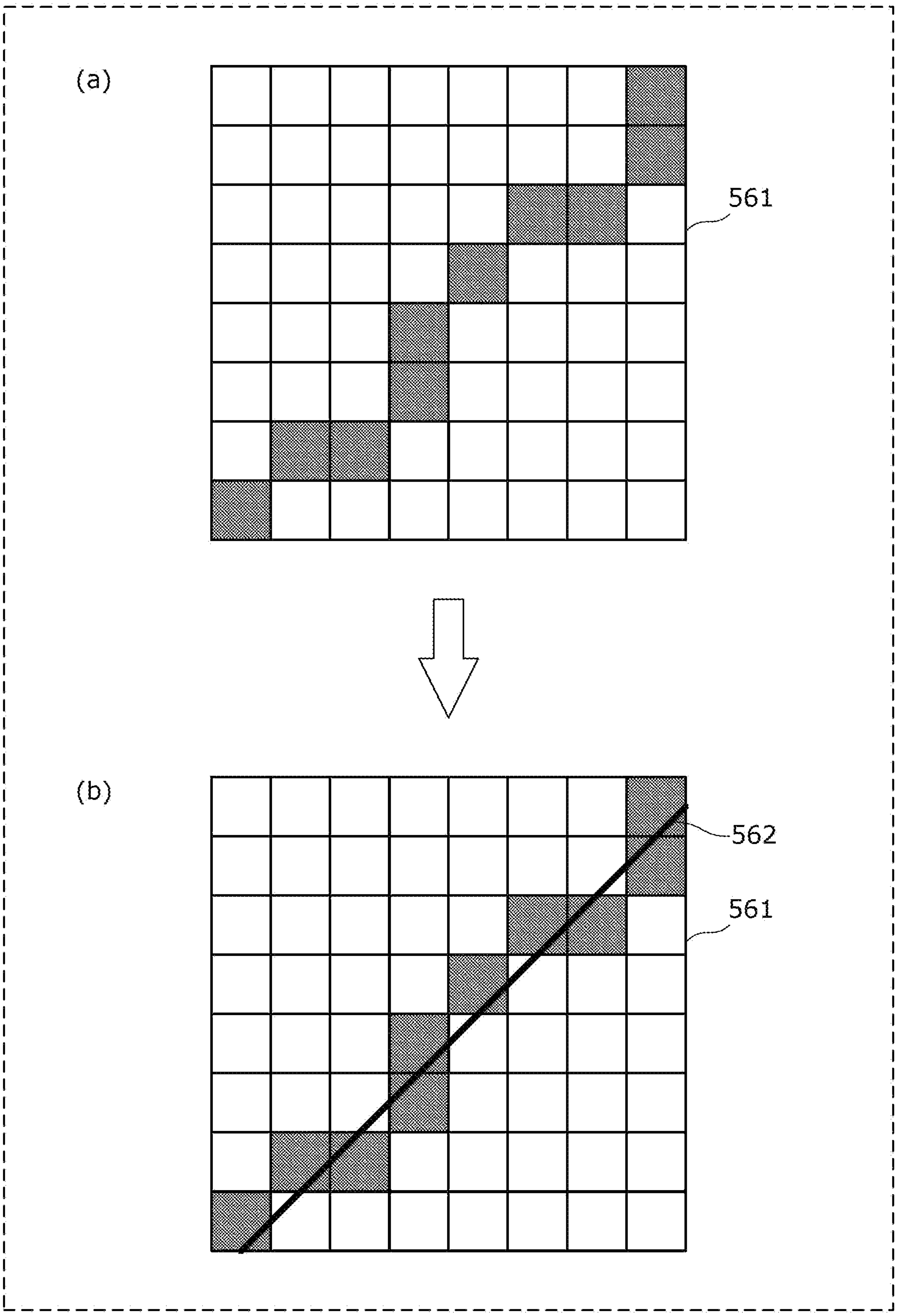
FIG. 17 is a diagram for describing an example of processing for correcting respective frames according to Embodiment 2.

FIG. 17 is a diagram for describing an example of processing in which corrector 141A corrects each frame according to Embodiment 2. Part (a) of FIG. 17 is a diagram illustrating another example of area 561 in Embodiment 1. In area 561 according to Embodiment 2, significant aliasing occurs, and there are missed pixels.

As illustrated in Part (b) of FIG. 17, corrector 141A detects line 562 in area 561 by performing the same processing as that performed by detector 142*a* in Embodiment 1. Corrector 141A calculates, as a corrected pixel value, an average value for a pixel group of a plurality of pixels through which line 562 passes. Provided that an i-th pixel value of the pixel group is $I_i$, the corrected pixel value is $I'_i$, and the number of the pixels included in the pixel group is n, corrector 141A can calculate the corrected pixel value $I'_i$ according to Equation 18.

[Math. 14]

$$I' = \frac{1}{n}\sum_{i=0}^{n} I_i \quad \text{(Equation 18)}$$

Figure 18:
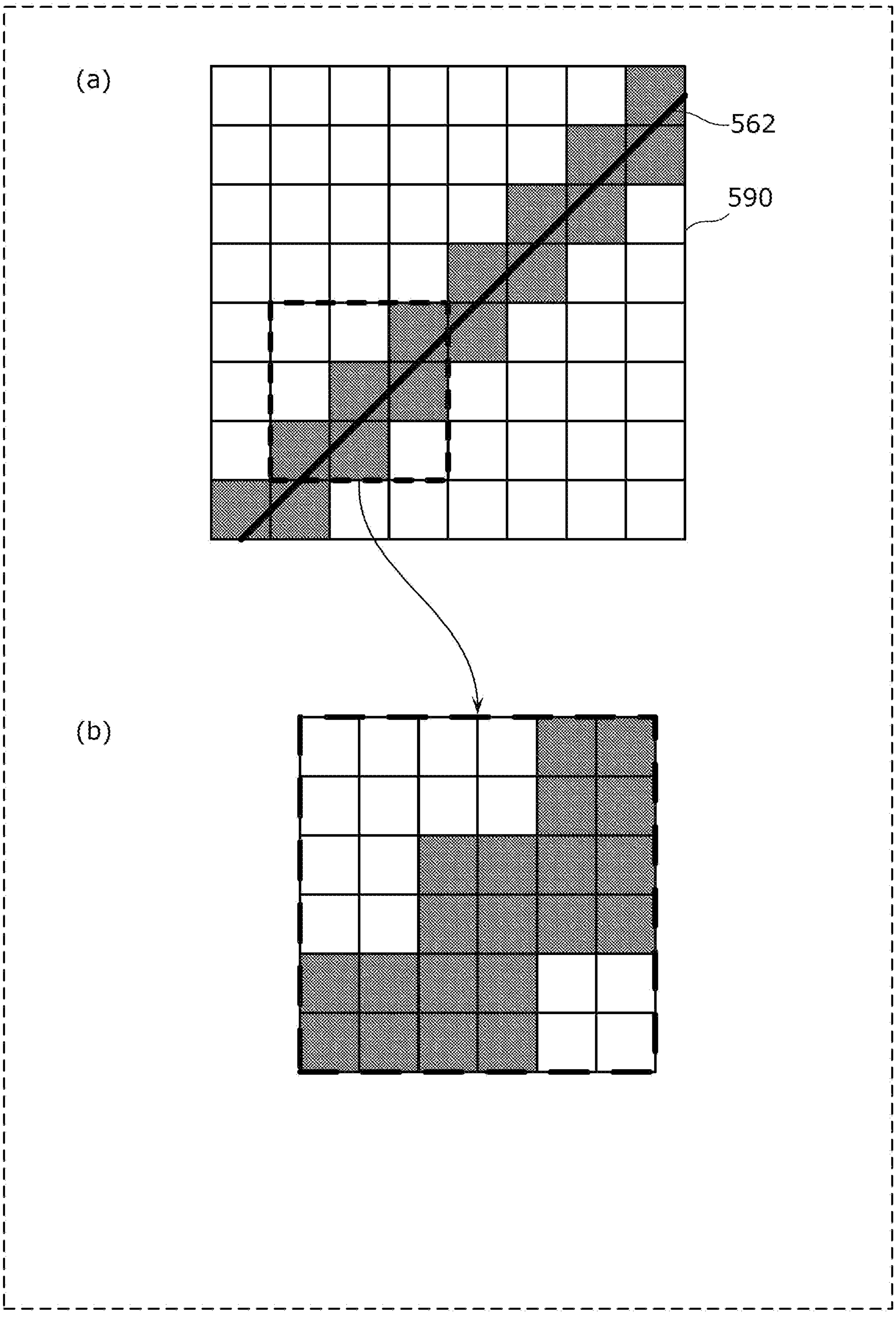
FIG. 18 is a diagram for describing an example of processing for correcting respective frames according to Embodiment 2.

As illustrated as area 590 in Part (a) of FIG. 18, corrector 141A then corrects area 561 by replacing all the pixels values of the pixel group of the plurality of pixels through which line 562 passes with the corrected pixel value $I'_i$. Note that FIG. 18 is a diagram for describing an example of processing for correcting each frame according to Embodiment 2.

Note that corrector 141A need not correct the pixel values of all the pixels of the pixel group, but may sample one or more pixels and perform the correction using the pixel values of the sampled one or more pixels. For example, the frame may be corrected by replacing all the pixel values of the pixel group of the plurality of pixels through which line 562 passes with an average of the pixel values of the sampled one or more pixels. Corrector 141A may also raise the resolution of the pixel group by using line 562, as illustrated in Part (b) of FIG. 18.

Restorer 142A performs matching by searching for a similar point in the frames corrected by corrector 141A, that is, the plurality of frames corrected, or more specifically, the corrected first frame and the corrected second frame. Restorer 142A performs the same processing as the processing performed by restorer 141 in Embodiment 1.

Next, an operation of three-dimensional model generation device 100A will be described. Three-dimensional model generation device 100A differs from three-dimensional model generation device 100 in details of step S104 in Embodiment 1 in the flowchart of FIG. 8, so that step S104 will be described in detail.

Figure 19:
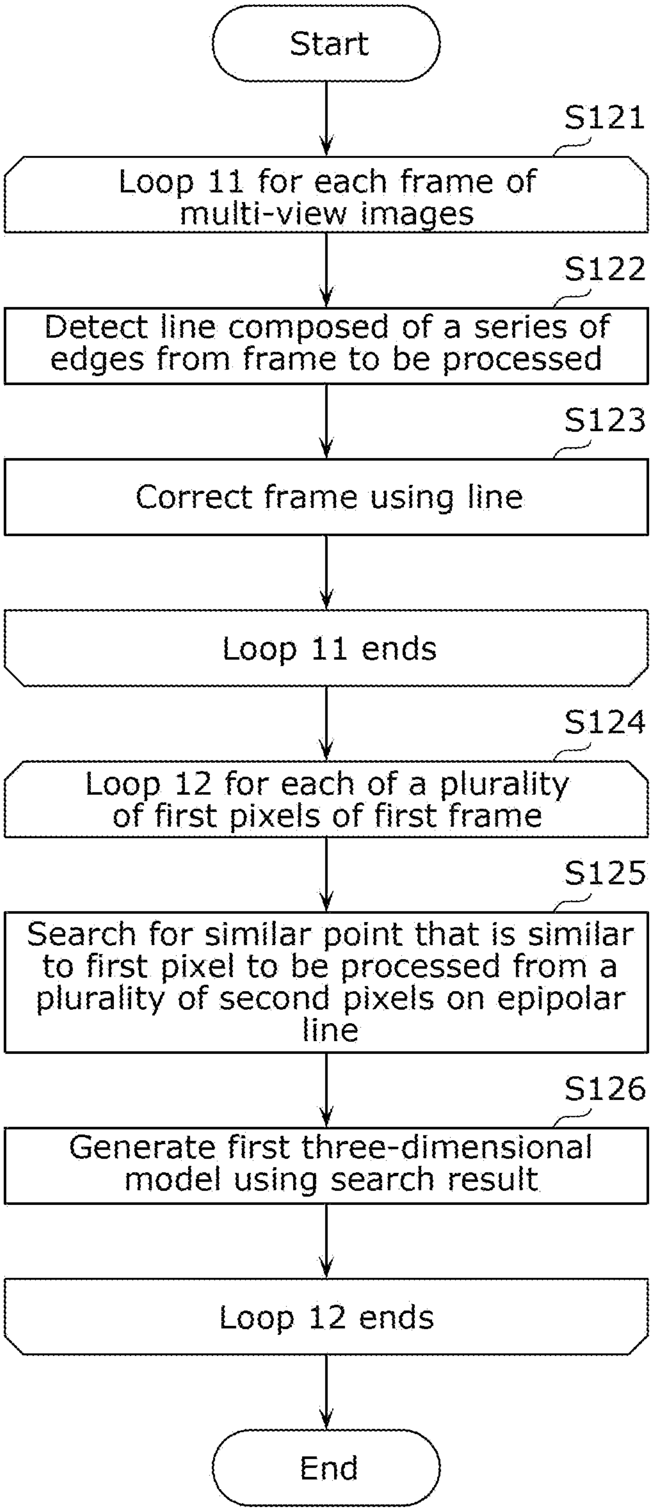
FIG. 19 is a flowchart illustrating an example of details of the generation processing in step S104 according to Embodiment 2.

FIG. 19 is a flowchart illustrating an example of details of generation processing in step S104 performed by generator 140A according to Embodiment 2.

Generator 140A performs loop 11 for each frame of a frame set of multi-view images shot at corresponding timings (S121). In loop 11, steps S122 and S123 are performed for each frame.

Corrector 141A detects a line of a subject in a frame to be processed by detecting a line composed of a series of edges in the frame (S122).

Corrector 141A corrects the frame to be processed using the line detected in the frame (S123).

Loop 11 ends when steps S122 and S123 end for all the frames.

Setting a plurality of the corrected frames as a processing target, restorer 142A then performs loop 12 on each of a plurality of first pixels in a first frame among the plurality of corrected frames (S124). In loop 12, processings of steps S125 and S126 are performed for each first pixel.

Restorer 142A searches for a similar point that is similar to the first pixel to be processed in a plurality of second pixels on an epipolar line corresponding to the first pixel on a plurality of second frames of the frame set to be processed (S125).

Restorer 142A generates a first three-dimensional point by performing triangulation using the search result from step S125. In this way, restorer 142A generates a first three-dimensional model including a plurality of first three-dimensional points (S126).

Loop 12 ends when the processings of steps S125 and S126 end for all the first pixels included in the first frame of the frame set to be processed.

According to three-dimensional model generation device 100A according to Embodiment 2, a first three-dimensional model is generated using images corrected using a line, it is possible to generate a first three-dimensional model having reduced error due to aliasing on the images.

Three-dimensional model generation device 100A according to Embodiment 2 obtains a plurality of frames generated by shooting a subject from a plurality of viewpoints (S101), detects, from one frame (first frame) among the plurality of frames, a line composed of a series of edges and corresponding to a contour of the subject (S122), and generates first three-dimensional points based on the plurality of frames and the line (S126).

Other Embodiments

In Embodiments 1 and 2 described above, examples in which a first three-dimensional model is generated using a line corresponding to a contour of a subject have been described. However, all lines need not be used to generate a first three-dimensional model. For example, three-dimensional model generation devices 100, 100A may exclude, from the plurality of first three-dimensional points, a three-dimensional point that is located within a predetermined distance from the viewpoint from which a frame is shot.

For example, with three-dimensional model generation device 100 according to Embodiment 1, when the distances, from the viewpoint, of a plurality of third three-dimensional points corresponding to the contour to which a detected line corresponds are shorter than a predetermined distance based on the detected line, corrector 142 need not use the line to correct the positions of the plurality of third three-dimensional points. That is, corrector 142 need not correct the position of a second three-dimensional point located within a predetermined distance from the viewpoint among the plurality of second three-dimensional points generated. That is, three-dimensional model generation device 100 may determine whether to perform correction for each line based on the distance from the viewpoint from which a frame is shot to the contour of the subject to which the line corresponds.

In this manner, since a first three-dimensional model is generated without using a line in a portion where accuracy tends to be above a certain level, the processing load can be reduced without incurring a deterioration in accuracy.

Furthermore, for example, when the distance from the viewpoint of the subject in each frame is obtained, three-dimensional model generation device 100A according to Embodiment 2 need not use the line corresponding to the contour located within a predetermined distance from the viewpoint to correct the pixel values of the pixel group on which the contour lies. For example, the distance of the subject from the viewpoint may be estimated using three-dimensional model 520 generated by estimation processing by estimation device 200. That is, three-dimensional model generation device 100 may determine, for each line based on the distance from the viewpoint from which a frame is shot to the contour to which the line corresponds, whether to perform correction of the part corresponding to the contour in the image.

Furthermore, in Embodiments 1 and 2 described above, examples have been described in which a line is detected for each of a plurality of frames, and a first three-dimensional model is generated using the detected line. However, lines obtained from all the frames need not be used to generate the first three-dimensional model. For example, three-dimensional model generation devices 100 and 100A may generate a plurality of first three-dimensional points without using an edge detected in a frame having a predetermined or higher resolution among a plurality of frames.

For example, three-dimensional model generation devices 100 and 100A need not perform processing for detecting a line in a frame whose resolution is equal to or higher than a predetermined resolution. This is because the accuracy of the first three-dimensional model generated using a frame whose resolution is equal to or higher than a predetermined resolution is equal to or higher than a predetermined accuracy. That is, three-dimensional model generation devices 100 and 100A may determine whether to perform detection of a line in a frame based on the resolution of the frame.

In this manner, since first three-dimensional points are generated without using a line in an image where accuracy tends to be above a certain level, the processing load can be reduced without incurring a deterioration in accuracy.

Although the three-dimensional model generation method, etc., according to the present disclosure has been described based on the embodiments described above, the present disclosure is not limited to the foregoing embodiments.

For example, in the foregoing embodiments, each of the processing units included in the three-dimensional model generation device is described as being implemented by a CPU and a control program. For example, each of the structural components of these processing units may be configured of one or more electronic circuits. Each of the one or more electronic circuits may be a general-purpose circuit or a dedicated circuit. The one or more electronic circuits may include, for example, a semiconductor device, an integrated circuit (IC), or a large-scale integration (LSI), etc. The IC or LSI may be integrated in a single chip or several chips. Although referred to here as IC or LSI, the name may change depending on the scale of integration, and may be referred to as a system LSI, very large scale integration (VLSI), or ultra large scale integration (ULSI). Furthermore, a field programmable gate array (FPGA) that can be programmed after manufacturing of the LSI may be used for the same purpose.

Furthermore, general or specific aspects of the present disclosure may be implemented as a system, an apparatus, a method, an integrated circuit, or a computer program. Alternatively, the general or specific aspects of the present disclosure may be implemented as a non-transitory computer-readable recording medium, such as an optical disc, a hard disk drive (HDD), or a semiconductor memory, on which the computer program is recorded. Furthermore, the general or specific aspects of the present disclosure may be implemented as any combination of a system, an apparatus, a method, an integrated circuit, a computer program, and a recording medium.

The present disclosure also includes forms obtained by making various modifications to the above embodiments that can be conceived by those skilled in the art, as well as forms realized by combining structural components and functions in the embodiments, without departing from the essence of the present disclosure.

INDUSTRIAL APPLICABILITY

The present disclosure can be applied to a three-dimensional model generation device or a three-dimensional model generation system, and can be applied to, for example, figure creation, topography or building structure recognition, human activity recognition, free-viewpoint video generation, or the like.

The invention claimed is:

1. A three-dimensional model generation method executed by a computer, the three-dimensional model generation method comprising:

obtaining a first image generated by shooting a subject from a first viewpoint and a second image generated by shooting the subject from a second viewpoint;

detecting, in at least the first image, a first line composed of a series of edges and corresponding to a contour of the subject; and generating first three-dimensional points representing the contour, in a three-dimensional space in the computer, based on the first image, the second image, and the first line, wherein the generating the first three-dimensional points includes:

(i)(a) correcting, based on the first line, positions of third three-dimensional points that correspond to the contour, the third three-dimensional points being among second three-dimensional points generated by performing matching by searching for similar points between the first image and the second image, the second three-dimensional points representing the subject, and (b) not correcting positions of one or more other three-dimensional points obtained by excluding the third three-dimensional points from the second three-dimensional points; or (ii)(a) generating a corrected first image by correcting pixel values of respective first pixels of a plurality of first pixels in the first image through which the first line passes, using the pixel values of the respective first pixels of the plurality of first pixels, (b) generating a corrected second image by correcting pixel values of respective second pixels of a plurality of second pixels in the second image through which a second line corresponding to the contour in the second image passes, using the pixel values of the respective second pixels of the plurality of second pixels, and (c) performing matching by searching for similar points between the corrected first image and the corrected second image.

2. The three-dimensional model generation method according to claim 1, wherein the first line is represented in units smaller than pixel units in the first image.

3. The three-dimensional model generation method according to claim 1, wherein the generating the first three-dimensional points includes:

specifying a plane by performing principal component analysis on the third three-dimensional points; and correcting the positions of the third three-dimensional points to bring the third three-dimensional points closer to the plane.

4. The three-dimensional model generation method according to claim 3, wherein the generating the first three-dimensional points includes generating, as the plane, a plane for which a sum of distances from the third three-dimensional points is smaller, between a first plane and a second plane, the first plane passing a center of gravity of the third three-dimensional points and having, as a normal line, a first principal component obtained by way of the principal component analysis, the second plane passing the center of gravity and having, as a normal line, a second principal component obtained by way of the principal component analysis.

5. The three-dimensional model generation method according to claim 1, wherein the generating the first three-dimensional points includes:

generating an approximate line by performing a least squares method on the third three-dimensional points; and correcting the positions of the third three-dimensional points to bring the third three-dimensional points closer to the approximate line.

6. The three-dimensional model generation method according to claim 1, wherein the generating the first three-dimensional points includes:

removing, from the first three-dimensional points, three-dimensional points located at positions whose distance from the first viewpoint is less than a predetermined distance.

7. The three-dimensional model generation method according to claim 1, wherein in the generating the first three-dimensional points, an edge detected from an image having a predetermined resolution or higher between the first image and the second image, is not used.

8. The three-dimensional model generation method according to claim 1, wherein the detecting includes detecting, in the second image, the second line corresponding to the contour of the subject, the second line being composed of a series of edges.

9. A three-dimensional model generation device comprising:

a processor; and a memory storing a program executable by the processor to cause the three-dimensional model generation device to:

obtain a first image generated by shooting a subject from a first viewpoint and a second image generated by shooting the subject from a second viewpoint;

detect, in at least the first image, a first line composed of a series of edges and corresponding to a contour of the subject; and generate first three-dimensional points representing the contour, in a three-dimensional space in a computer, based on the first image, the second image, and the first line, wherein in the generating the first three-dimensional points, the three-dimensional model generation device:

(i)(a) corrects, based on the first line, positions of third three-dimensional points that correspond to the contour, the third three-dimensional points being among second three-dimensional points generated by performing matching by searching for similar points between the first image and the second image, the second three-dimensional points representing the subject, and (b) does not correct positions of one or more other three-dimensional points obtained by excluding the third three-dimensional points from the second three-dimensional points; or (ii)(a) generates a corrected first image by correcting pixel values of respective first pixels of a plurality of first pixels in the first image through which the first line passes, using the pixel values of the respective first pixels of the plurality of first pixels, (b) generates a corrected second image by correcting pixel values of respective second pixels of a plurality of second pixels in the second image through which a second line corresponding to the contour in the second image passes, using the pixel values of the respective second pixels of the plurality of second pixels, and (c) performs matching by searching for similar points between the corrected first image and the corrected second image.

10. A non-transitory computer readable medium storing a program executable by a processor to cause an information processing apparatus to:

obtain a first image generated by shooting a subject from a first viewpoint and a second image generated by shooting the subject from a second viewpoint;

detect, in at least the first image, a first line composed of a series of edges and corresponding to a contour of the subject; and generate first three-dimensional points representing the contour, in a three-dimensional space in a computer, based on the first image, the second image, and the first line, wherein in the generating the first three-dimensional points, the information processing apparatus:

(i)(a) corrects, based on the first line, positions of third three-dimensional points that correspond to the contour, the third three-dimensional points being among second three-dimensional points generated by performing matching by searching for similar points between the first image and the second image, the second three-dimensional points representing the subject, and (b) does not correct positions of one or more other three-dimensional points obtained by excluding the third three-dimensional points from the second three-dimensional points; or (ii)(a) generates a corrected first image by correcting pixel values of respective first pixels of a plurality of first pixels in the first image through which the first line passes, using the pixel values of the respective first pixels of the plurality of first pixels, (b) generates a corrected second image by correcting pixel values of respective second pixels of a plurality of second pixels in the second image through which a second line corresponding to the contour in the second image passes, using the pixel values of the respective second pixels of the plurality of second pixels, and (c) performs matching by searching for similar points between the corrected first image and the corrected second image.

* * * * *